US009408204B2

(12) United States Patent
Takeda et al.

(10) Patent No.: US 9,408,204 B2
(45) Date of Patent: Aug. 2, 2016

(54) RADIO BASE STATION APPARATUS, USER TERMINAL, RADIO COMMUNICATION SYSTEM AND RADIO COMMUNICATION METHOD

(71) Applicant: NTT DOCOMO, INC., Tokyo (JP)

(72) Inventors: Kazuaki Takeda, Tokyo (JP); Yoshihisa Kishiyama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 141 days.

(21) Appl. No.: 14/356,313

(22) PCT Filed: Nov. 7, 2012

(86) PCT No.: PCT/JP2012/078795
§ 371 (c)(1),
(2) Date: May 5, 2014

(87) PCT Pub. No.: WO2013/069663
PCT Pub. Date: May 16, 2013

(65) Prior Publication Data
US 2014/0314036 A1  Oct. 23, 2014

(30) Foreign Application Priority Data

Nov. 7, 2011 (JP) .................................. 2011-244006
Mar. 19, 2012 (JP) .................................. 2012-062821

(51) Int. Cl.
| | |
|---|---|
| *H04W 4/00* | (2009.01) |
| *H04W 72/04* | (2009.01) |
| *H04L 5/00* | (2006.01) |
| *H04B 7/04* | (2006.01) |

(Continued)

(52) U.S. Cl.
CPC ........... *H04W 72/042* (2013.01); *H04L 5/0048* (2013.01); *H04L 5/0053* (2013.01); *H04B 7/0452* (2013.01); *H04L 5/001* (2013.01); *H04L 5/005* (2013.01)

(58) Field of Classification Search
CPC ............ H04W 72/042; H04W 56/003; H04W 56/005; H04L 5/0048; H04L 5/0053; H04L 5/001; H04L 5/005; H04B 7/0452
See application file for complete search history.

(56) References Cited

U.S. PATENT DOCUMENTS

| 9,125,135 B2 * | 9/2015 | Parkvall ................ H04W 48/08 |
| 2011/0243059 A1 * | 10/2011 | Liu ....................... H04L 1/0046 |
| | | 370/315 |

(Continued)

FOREIGN PATENT DOCUMENTS

| WO | 2011/136523 A2 | 11/2011 |
| WO | 2012/150664 A1 | 11/2012 |

OTHER PUBLICATIONS

Office Action issued in corresponding Japanese application No. 2012-062821 along with English language communication reporting the same; dated Nov. 12, 2013 (7 pages).

(Continued)

*Primary Examiner* — Robert Wilson
(74) *Attorney, Agent, or Firm* — Osha Liang LLP

(57) ABSTRACT

In a configuration in which a downlink control channel is enhanced, the present invention is designed to adequately allocate downlink control signals to radio resources for the enhanced control channel. An allocation section that allocates a downlink control signal to both of a first control region from the first OFDM symbol to a predetermined OFDM symbol in a subframe, which is a transmission time interval, and a plurality of second control regions, each of which is frequency-division-multiplexed with a data region in a region after the predetermined OFDM symbol and is formed in a predetermined resource block size, or allocates the downlink control signal only to the second control regions, and a transmission section that transmits the downlink control signals to a user terminal are provided, and the allocation section forms the plurality of second control regions such that each second control region includes a plurality of enhanced control channel elements, each of which is an allocation unit of downlink control information, and also divides the enhanced control channel elements, and performs distributed mapping such that the divided enhanced control channel elements are distributed over the plurality of second control regions of varying frequency bands.

9 Claims, 24 Drawing Sheets

(56) References Cited

U.S. PATENT DOCUMENTS

| | | | |
|---|---|---|---|
| 2012/0155561 A1* | 6/2012 | Seo | H04B 7/15542 375/260 |
| 2012/0207084 A1* | 8/2012 | Seo | H04B 7/155 370/315 |
| 2013/0039284 A1* | 2/2013 | Marinier | H04L 5/001 370/329 |
| 2013/0039291 A1* | 2/2013 | Blankenship | H04L 5/001 370/329 |
| 2014/0064244 A1* | 3/2014 | Kishiyama | H04W 72/042 370/330 |
| 2014/0314036 A1* | 10/2014 | Takeda | H04L 5/0048 370/329 |

OTHER PUBLICATIONS

NTT DOCOMO; "Enhanced PDCCH for DL MIMO in Rel-11"; 3GPP TSG RAN WG1 Meeting #66bis, R1-113297; Zhuhai, China; Oct. 10-14, 2011 (6 pages).

Alcatel-Lucent "Design details for enhanced PDCCH"; 3GPP TSG RAN WG1 Meeting #66bis, R1-113322; Zhuhai, China; Oct. 10-14, 2011 (5 pages).

Research in Motion; "E-PDCCH Transmission with Transmit Diversity"; 3GPP TSG RAN WG1 Meeting #66bis, R1-113238; Zhuhai, China; Oct. 10-14, 2011 (4 pages).

Intel Corporation; "Performance Analysis of the Enhanced Downlink Control Signalling"; 3GPP TSG RAN WG1 Meeting #66bis, R1-113202; Zhuhai, China; Oct. 10-14, 2011 (5 pages).

International Search Report issued in PCT/JP2012/078795 mailed on Dec. 18, 2012 (2 pages).

NTT DOCOMO; "Resource Mapping Scheme for E-PDCCH"; 3GPP TSG RAN WG1 Meeting #68bis, R1-121477; Jeju, Korea; Mar. 26-30, 2012 (6 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).

Decision to Grant a Patent issued in corresponding Japanese Application No. 2012-062821, mailed Feb. 12, 2014 (4 pages).

* cited by examiner

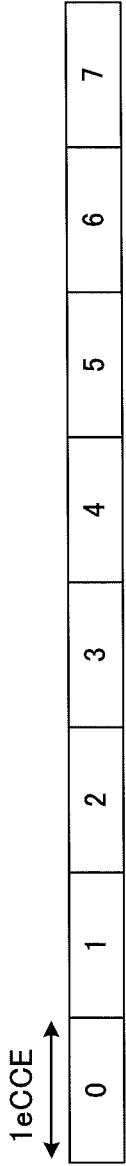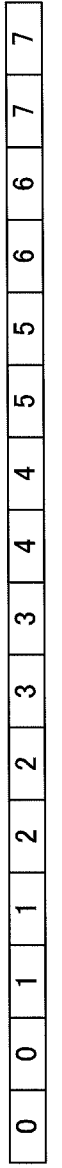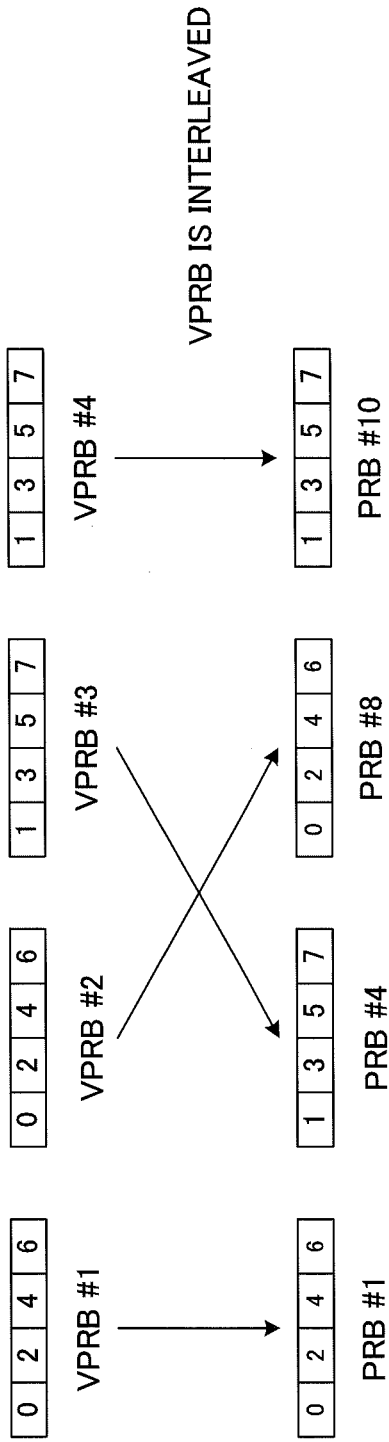

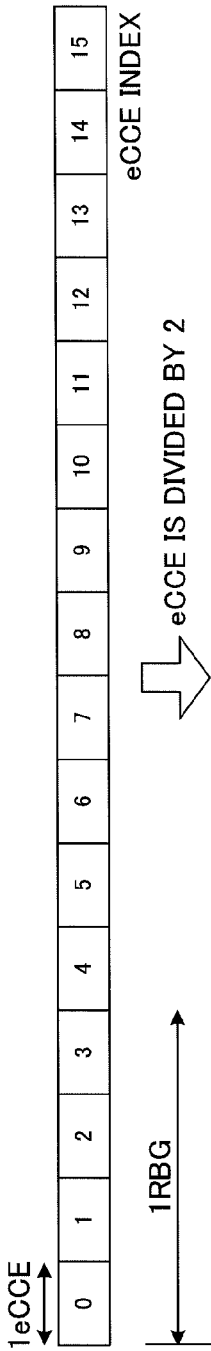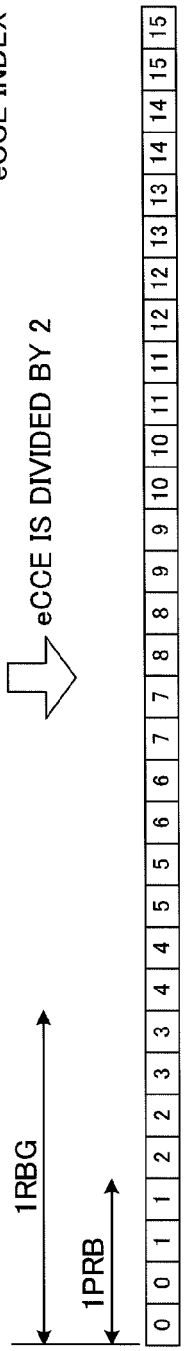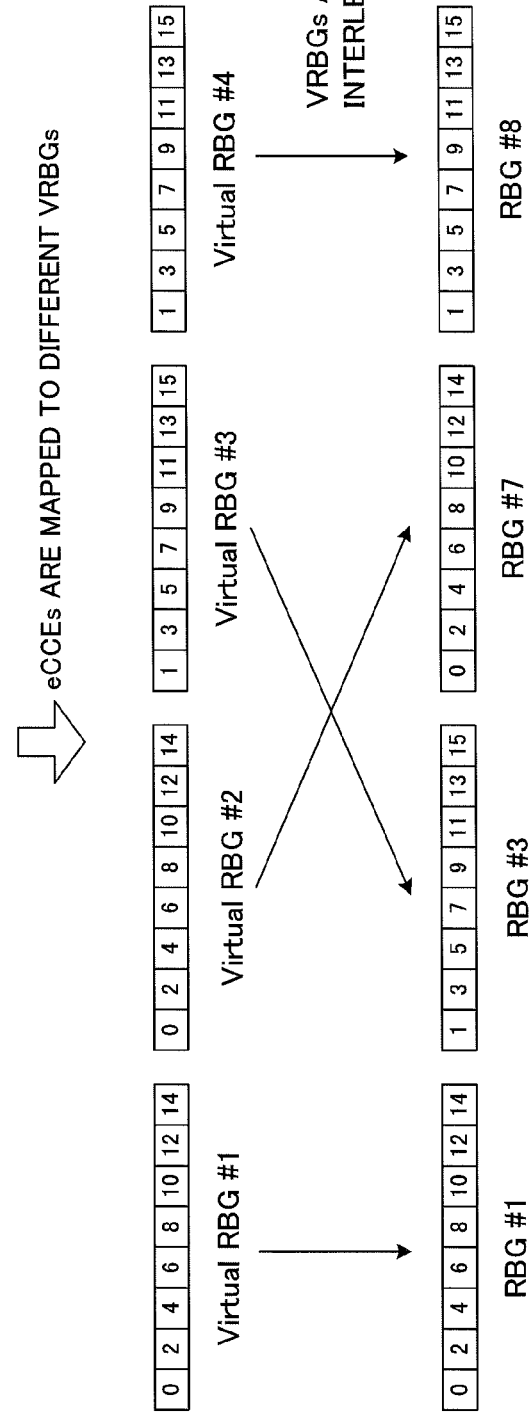

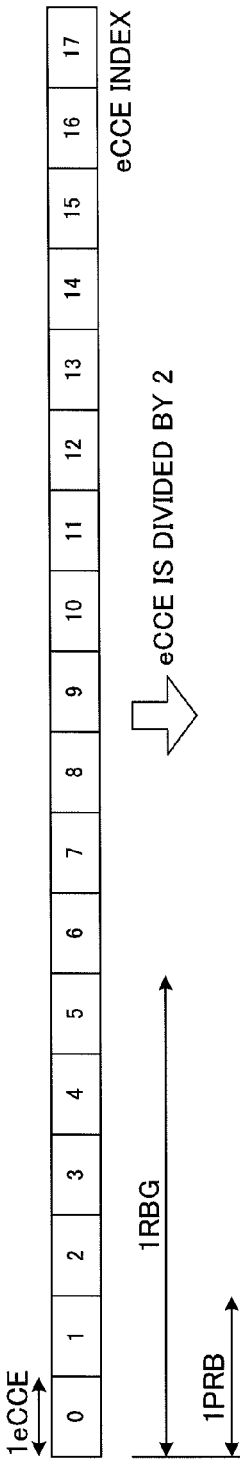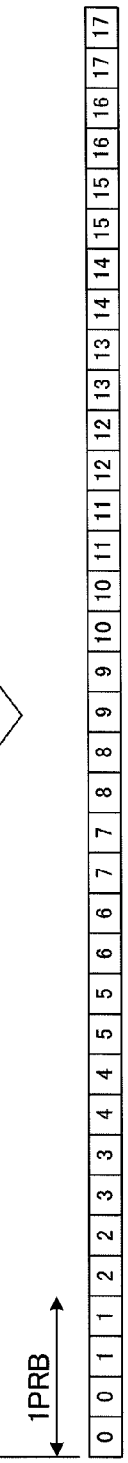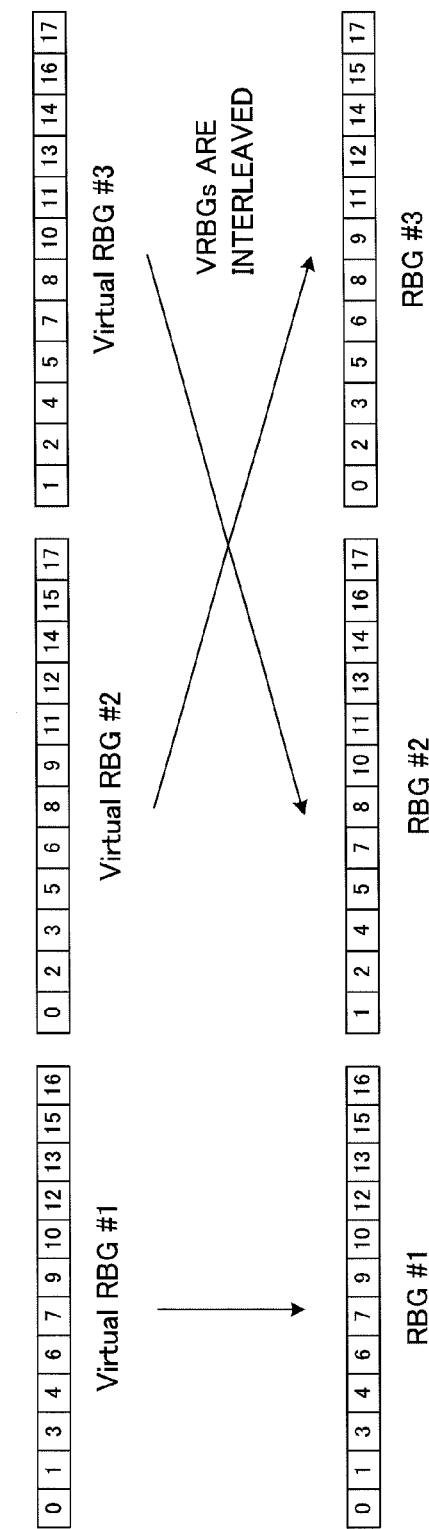
FIG. 10A
FIG. 10B
FIG. 10C
FIG. 10D

Ex. 4 PRBs → 8 eCCEs
FIG. 18A   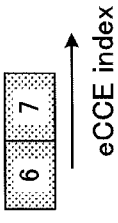
FIG. 18B   

RADIO BASE STATION APPARATUS, USER TERMINAL, RADIO COMMUNICATION SYSTEM AND RADIO COMMUNICATION METHOD

TECHNICAL FIELD

The present invention relates to a radio base station apparatus, a user terminal, a radio communication system and a radio communication method in a next-generation radio communication system.

BACKGROUND ART

In the UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used on the downlink, and a scheme that is based on SC-FDMA (Single Carrier Frequency Division Multiple Access) is used on the uplink.

Also, successor systems of LTE (referred to as, for example, "LTE-Advanced" or "LTE enhancement" (hereinafter referred to as "LTE-A")) are under study for the purposes of further broadbandization and increased speed beyond LTE. In LTE (Rel. 8) and LTE-A (Rel. 9 and Rel. 10), a MIMO (Multi Input Multi Output) techniques are under study as radio communication techniques to transmit and receive data by a plurality of antennas and improve spectral efficiency. According to MIMO techniques, a plurality of transmitting/receiving antennas are provided in the transmitter/receiver, so that different transmission information sequences are transmitted from different transmitting antennas at the same time.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, in LTE-A, which is a successor system of LTE, multiple-user MIMO (MU-MIMO) transmission to transmit transmission information sequences to different users from different transmitting antennas at the same time, is defined. This MU-MIMO transmission is also under study for further application to a Hetnet (Heterogeneous network), COMP (Coordinated Multi-Point) transmission, and so on.

In future systems, the capacity of downlink control channels to transmit downlink control signals is expected to run short, due to an increase in the number of users to be connected to a radio base station apparatus. Consequently, there is a threat that conventional radio resource allocation methods fail to optimize the characteristics of future systems such as MU-MIMO transmission.

As a method to solve such problems, a method of extending the region to allocate downlink control channels and transmitting more downlink control signals may be possible. However, when a downlink control channel is enhanced, how to allocate downlink control signals to the radio resources for the enhanced downlink control channel becomes important.

The present invention has been made in view of the above, and it is therefore an object of the present invention to provide a radio base station apparatus, a user terminal, a radio communication system and a radio communication method, whereby, in a configuration in which a downlink control channel is enhanced, downlink control signals can be adequately allocated to radio resources for the enhanced control channel.

Solution to Problem

A radio base station apparatus according to the present invention has an allocation section configured to allocate a downlink control signal to both of a first control region from a first OFDM symbol to a predetermined OFDM symbol in a frame which is a transmission time interval, and a plurality of second control regions, each of which is frequency-division-multiplexed with a data region in a region after the predetermined OFDM symbol and is formed in a predetermined resource block size, or allocate the downlink control signal only to the second control regions, and a transmission section configured to transmit the downlink control signals allocated to the first control region and the second control regions to a user terminal, and, in this radio base station apparatus, the allocation section is configured to form each of the plurality of second control regions including a plurality of enhanced control channel elements, each of which is an allocation unit of downlink control information, and also divide each of the enhanced control channel elements, and perform distributed mapping such that the divided enhanced control channel elements are distributed over the plurality of second control regions of varying frequency bands.

A user terminal according to the present invention has a receiving section configured to receive a downlink control signal that is allocated to both of a first control region from a first OFDM symbol to a predetermined OFDM symbol in a frame which is a transmission time interval, and a plurality of second control regions, each of which is frequency-division-multiplexed with a data region in a region after the predetermined OFDM symbol and which is formed in a predetermined resource block size, or that is allocated only to the second control regions; and a demodulation section configured to demodulate the downlink control signal received in the receiving section, and in the user terminal, each of the plurality of second control regions is formed with a plurality of enhanced control channel elements of varying index numbers, and also enhanced control channel elements of a same index number are divided and the divided enhanced control channel elements are mapped to the plurality of second control regions of varying frequency bands, and the demodulation section is configured to perform demodulation using the enhanced control channel elements as a fundamental unit.

A radio communication system according to the present invention has a radio base station apparatus, which includes an allocation section configured to allocate a downlink control signal to both of a first control region from a first OFDM symbol to a predetermined OFDM symbol in a subframe, which is a transmission time interval, and a plurality of second control regions, each of which is frequency-division-multiplexed with a data region in a region after the predetermined OFDM symbol and is formed in a predetermined resource block size, or allocate the downlink control signal only to the second control regions; and a transmission section configured to transmit the downlink control signal allocated to the first control region and the second control regions to a user terminal; and a user terminal, which includes a receiving section configured to receive the downlink control signals that is allocated to the first control region and the second control regions, and a demodulation section configured to demodulate the downlink control signal received in the receiving section, and, in this radio communication system, the allocation section is configured to form each of the plurality of second control regions including a plurality of enhanced control channel elements, each of which is an allocation unit of downlink control information, and also divide each of the enhanced control channel elements, and perform distributed mapping such that the divided enhanced control channel elements are distributed over the plurality of second control regions of varying frequency bands.

A radio communication method according to the present invention is a radio communication method of transmitting a downlink control signal generated in a radio base station apparatus to a user terminal, and controlling demodulation of the downlink control signal received in the user terminal, and this radio communication method includes the steps in which: the radio base station apparatus: allocates the downlink control signal to both of a first OFDM symbol to a predetermined OFDM symbol in a frame, which is a transmission time interval, and a plurality of second control regions, each of which is frequency-division-multiplexed with a data region in a region after the predetermined OFDM symbol and is formed in a predetermined resource block size, or allocating the downlink control signal only to the second control regions; and transmits the downlink control signal allocated to the first control region and the second control regions to the user terminal; and the user terminal: receives the downlink control signal allocated to the radio base station apparatus; and demodulates the received downlink control signals, and in this radio communication method, the radio base station apparatus forms each of the plurality of second control regions including a plurality of enhanced control channel elements, each of which is an allocation unit of downlink control information, and also divides the enhanced control channel elements, and performs distributed mapping such that the divided enhanced control channel elements are distributed over the plurality of second control regions of varying frequency bands.

Advantageous Effects of Invention

According to the present invention, in a configuration in which a downlink control channel is enhanced, it becomes possible to adequately allocate downlink control signals to radio resources for the enhanced control channel.

BRIEF DESCRIPTION OF DRAWINGS

FIG. 8 provides diagrams to show an example of a distributed mapping method according to the present embodiment;

FIG. 9 provides diagrams to show another example of a distributed mapping method according to the present embodiment;

FIG. 10 provides diagrams to show another example of a distributed mapping method according to the present embodiment;

FIG. 14 is a diagram to show an example of a distributed mapping method according to the present embodiment;

DESCRIPTION OF EMBODIMENTS

Figure 1:
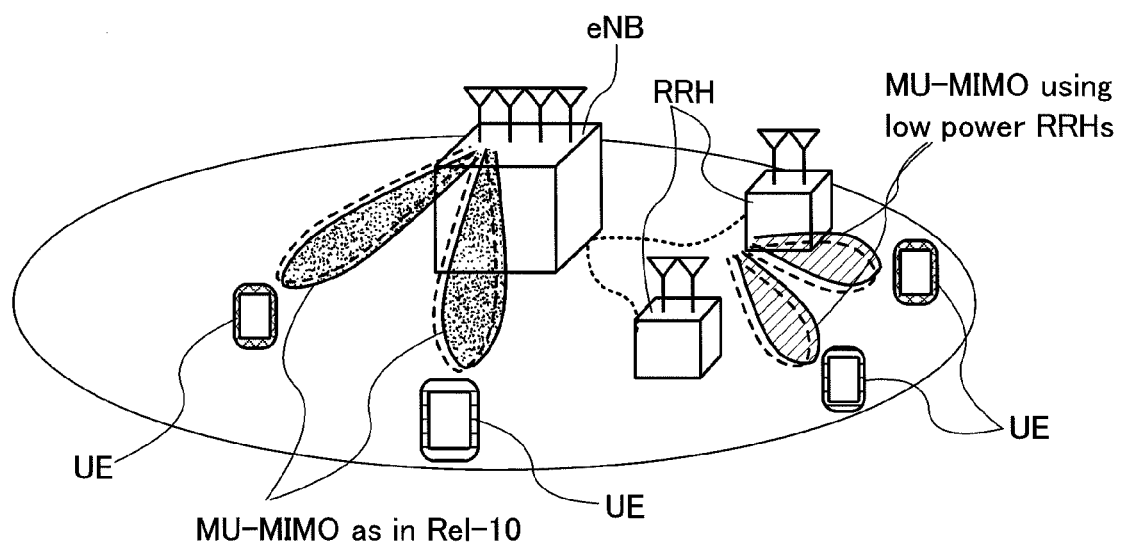
FIG. 1 is a schematic diagram of a Hetnet where MU-MIMO is applied.

FIG. 1 is a diagram to show an example of a Hetnet where MU-MIMO transmission is applied. The system shown in FIG. 1 is configured in layers, by providing small base station apparatuses (for example, RRHs (Remote Radio Heads)), which have local coverage areas in the coverage area of a radio base station apparatus (for example, eNB (eNodeB)). In downlink MU-MIMO transmission in this system, data for a plurality of user terminals UE (User Equipment) #1 and UE #2 is transmitted at the same time from a plurality of antennas of the radio base station apparatus. Also, data for a plurality of user terminals UE #3 and UE #4 is transmitted at the same time from a plurality of antennas of a plurality of small base station apparatuses.

Figure 2:
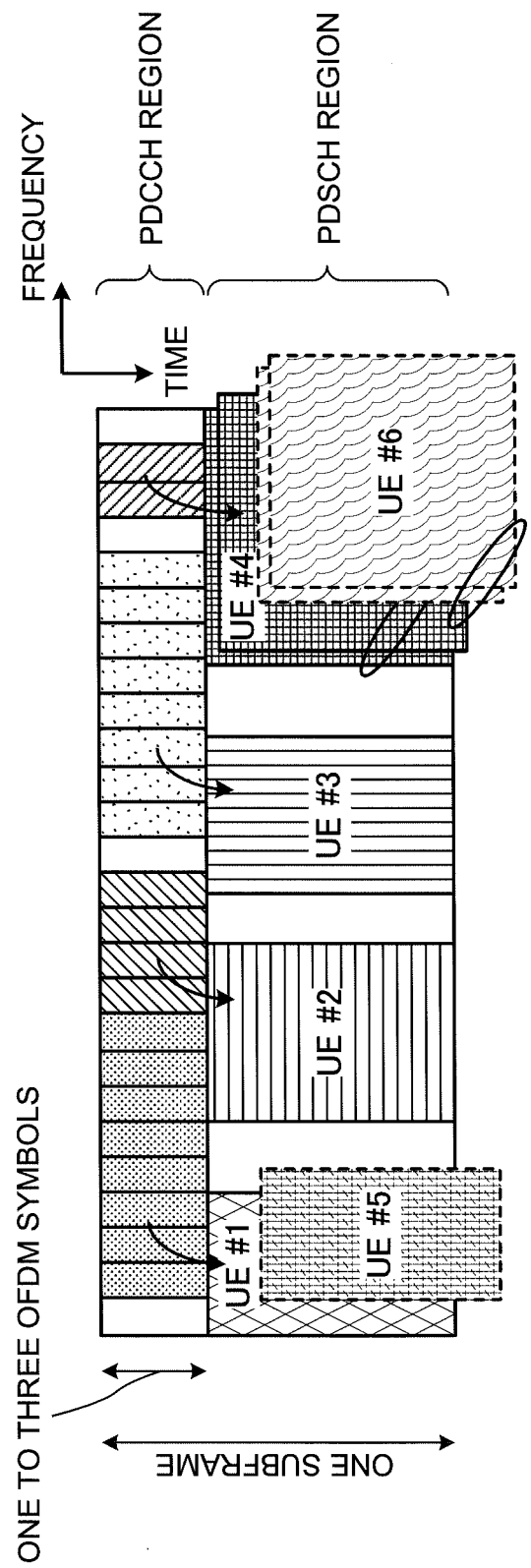
FIG. 2 is a diagram to show an example of a subframe where downlink MU-MIMO transmission is performed.

FIG. 2 is a diagram to show an example of a radio frame (for example, one subframe) where downlink MU-MIMO transmission is applied. As shown in FIG. 2, in a system adopting MU-MIMO transmission, a predetermined number of OFDM symbols from the first (first one to three OFDM symbols) in each subframe are secured as a control region (PDCCH region) for a downlink control channel (PDCCH: Physical Downlink Control Channel). Also, a data region (PDSCH region) for a downlink data channel (PDSCH: Physical Downlink Shared CHannel) is secured in radio resources following the predetermined number of symbols from the subframe top.

In the PDCCH region, downlink control information (DCI) for user terminal UEs (here, UEs #1 to #4) is allocated. The downlink control information (DCI) includes allocation information in the PDSCH region. In this way, in each subframe, downlink data signals for user terminal UEs and downlink control information (DCI) signals for receiving that downlink data are time-division-multiplexed and transmitted.

MU-MIMO transmission makes it possible to transmit data to a plurality of user terminal UEs at the same time and in the same frequency. Consequently, in the PDSCH region of FIG. 2, it is possible to multiplex data for user terminal UE #1 and data for user terminal UE #5 over the same frequency region. Similarly, it is also possible to multiplex data for user terminal UE #4 and data for user terminal UE #6 over the same frequency region.

However, when downlink control information for many user terminal UEs is allocated to the PDCCH region, cases might occur where, as shown in FIG. 2, PDCCH regions for transmitting downlink control information corresponding to user terminal UEs #5 and #6 run short. In this case, the number of user terminal UEs that can be multiplexed over the PDSCH region is limited.

In this way, there is a threat that, even when the number of user terminals to multiplex over the same radio resources is increased by MU-MIMO transmission, if the PDCCH region for transmitting downlink control information runs short, it is not possible to optimize the efficiency of use of the PDSCH region.

Figure 3A:
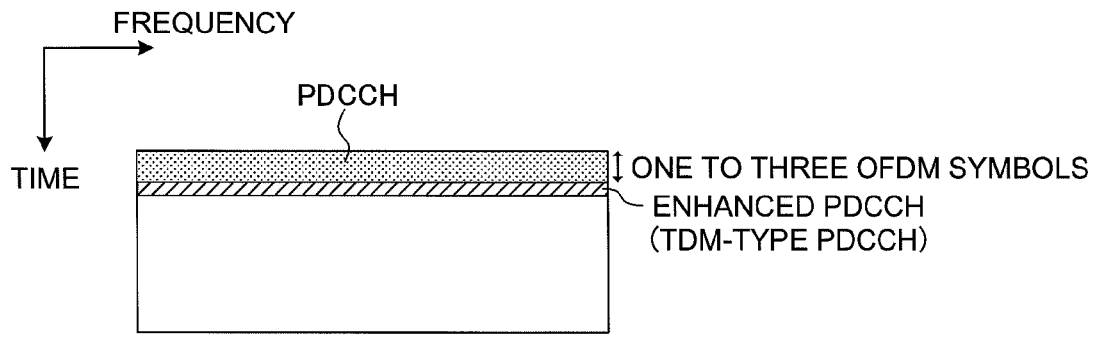
FIG. 3 provides diagrams to explain enhanced PDCCHs (TDM type and FDM type)
Figure 3B:
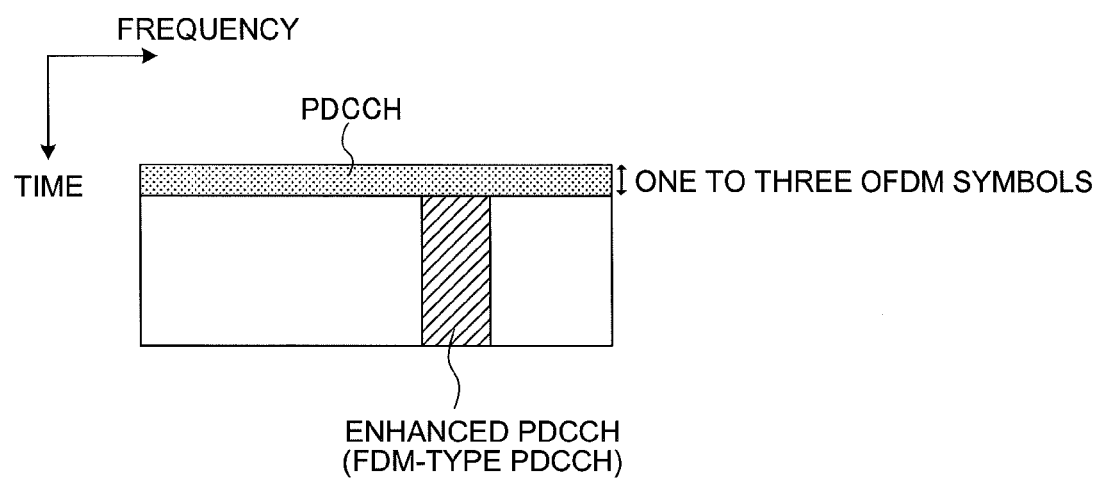

As a method of solving such shortage of the PDCCH region, it may be possible to extend the region to allocate PDCCHs beyond the control region that is maximum three OFDM symbols from the first in a subframe (that is, extend the PDCCH region into the existing PDSCH region). As for the method of extending the PDCCH allocation region, a method to extend the existing PDCCH region, which has been maximum three OFDM symbols from the first in a subframe heretofore, to four OFDM symbols or more (time-division (TDM) approach) as shown in FIG. 3A, and a method to frequency-divide the PDSCH region to allow use of a new PDCCH region (frequency-division (FDM) approach) as shown in FIG. 3B, may be possible.

The present inventor has focused on the fact that, when the latter frequency division approach is applied, it becomes possible to achieve beam forming gain by demodulating enhanced PDCCHs using user-specific reference signals (DM-RSs: DeModulation-Reference Signals). In this case, individual beam forming for user terminal UEs become possible and sufficient received quality can be achieved, so that this may be effective to increase capacity.

Figure 4:
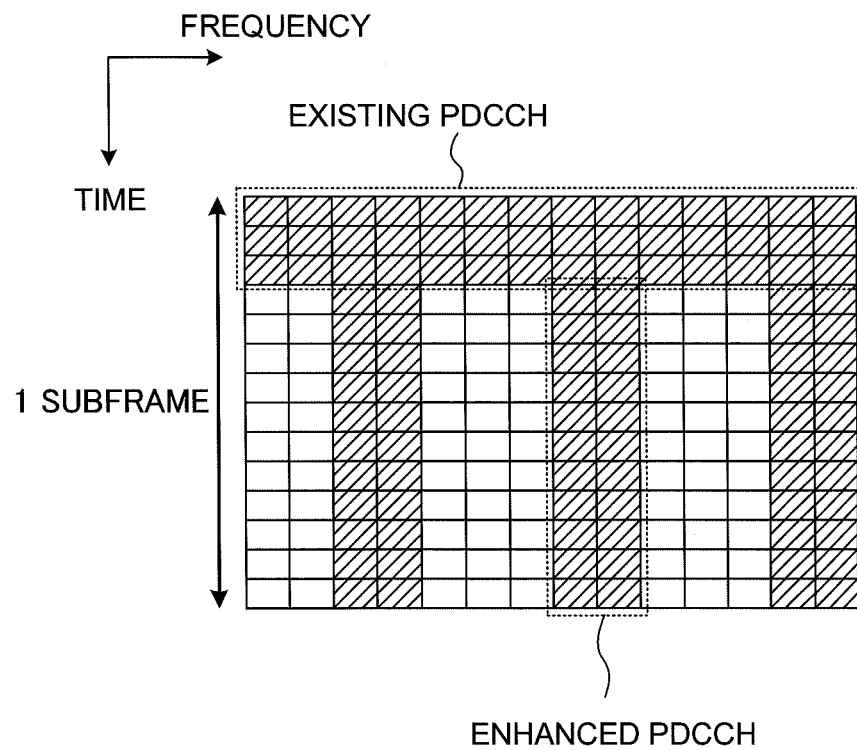
FIG. 4 is a diagram to explain a subframe configuration of enhanced PDCCHs.

FIG. 4 shows an example of a frame configuration when applying the frequency division approach. In the frame configuration shown in FIG. 4, an existing PDCCH and enhanced PDCCHs (also referred to as "FDM-type PDCCHs," "enhanced PDCCHs," "UE-PDCCHs" and so on) are arranged. In the first control region, which is from the first OFDM symbol to a predetermined OFDM symbol (first one to three OFDM symbols) in a frame (hereinafter referred to as "subframe") that is a transmission time interval, an existing PDCCH is arranged over the entire system band. In radio resources following the OFDM symbols where the existing PDCCH is arranged, enhanced PDCCHs are arranged.

To be more specific, enhanced PDCCHs are arranged in a plurality of second control regions, which are frequency-divided with data regions (PDSCH regions) in the region behind the predetermined number of OFDM symbols. A second control region is formed in a predetermined resource block size, and its size (bandwidth in the frequency domain) is, for example, the size of the radio resource scheduling unit (one resource block (RB)).

Downlink control information (DCI) for user terminals is allocated in the first control region where an existing PDCCH is arranged and in second control regions where enhanced PDCCHs are arranged. Allocation information in the PDSCH region is included in the downlink control information (DCI) for user terminals. In the LTE-A system (Rel. 10), as downlink control information, a downlink scheduling assignment (DL assignment) for controlling a downlink data channel (PDSCH), an uplink scheduling grant (UL Grant) for controlling an uplink data channel (PUSCH), and so on, are defined.

Also, in the frame configurations of Rel. 11 and later versions, a carrier type (extension carrier), which provides no existing PDCCH region in subframes, is under study. Consequently, with the present invention, a configuration that not only allocates downlink control signals to both the first control region where an existing PDCCH is arranged and second control regions where enhanced PDCCHs are arranged, but that also allocates downlink control signals only to the second control regions, on a selective basis, may be possible. That is, when the frequency division approach is applied, a radio base station apparatus can allocate only enhanced PDCCHs, and not allocate an existing PDCCH, to predetermined subframes where the extension carrier type is applied. Note that, when this does take place, it is also possible to allocate enhanced PDCCHs to first one to three OFDM symbols, in predetermined subframes where the extension carrier type is applied.

On the other hand, when the frequency division approach is applied, a plurality of enhanced PDCCHs are expected to be allocated to discontinuous frequency bands, so that the method of allocating downlink control signals to the enhanced PDCCHs becomes important. Now, an example of a method of allocating downlink control signals to enhanced PDCCHs will be described below with reference to FIG. 5.

Figure 5:
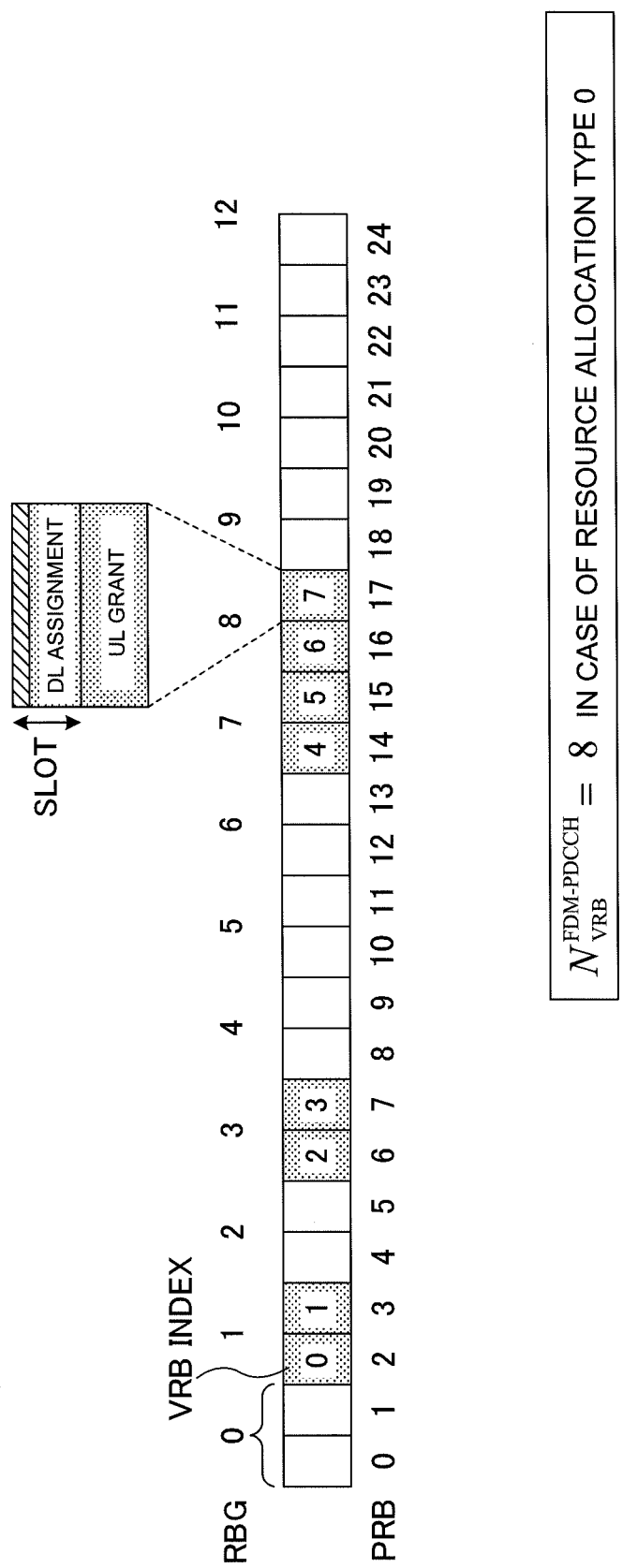
FIG. 5 is a diagram to show an example of allocation of enhanced PDCCHs to a system band.

FIG. 5 shows a case where a plurality of virtual resources are mapped to a plurality of enhanced PDCCHs and downlink control signals are allocated to these virtual resources. Note that FIG. 5 shows a case where, to a bandwidth formed with twenty-five physical resource blocks (PRBs), eight physical resource blocks are applied as enhanced PDCCHs. In this case, eight virtual resource block (VRB) sets, which correspond to the enhanced PDCCHs, are set.

Also, in the PRBs, $N_{VRB}$ VRB sets are set based on the resource allocation type (resource allocation type 0, 1 or 2). The resource allocation types 0 and 1 support discontinuous frequency arrangement in the frequency domain, and the resource allocation type 2 supports only continuous frequency arrangement in the frequency domain. The resource allocation type 0 is represented in search space that is defined with a VRB index. By this means, channel estimation in PRB units is made possible, so that effective beam forming for each user terminal UE becomes possible.

Note that, in the event of "without cross interleaving," the radio base station apparatus is able to determine the number of VRBs to allocate in a row (for example, aggregation level $\Lambda$ (=1, 2, 4 or 8)) based on the received quality that is reported from each user terminal.

In this case, a user terminal monitors a plurality of candidate enhanced PDCCHs that may be set by higher layer signaling. The VRBs of the enhanced PDCCH where DCI for the user terminal is allocated, and the aggregation level that is selected, are not reported to that user terminal. Consequently, the user terminal tries the decoding process for an enhanced PDCCH with all the VRBs where DCI for that user terminal may be allocated, on a round robin basis (blind decoding).

Also, the radio base station apparatus is able to set search spaces on a per user terminal basis so as to reduce the number of times that a user terminal tries blind decoding with enhanced PDCCHs. A user terminal performs blind decoding with an enhanced PDCCH in a corresponding search space (see FIG. 6).

Figure 6:
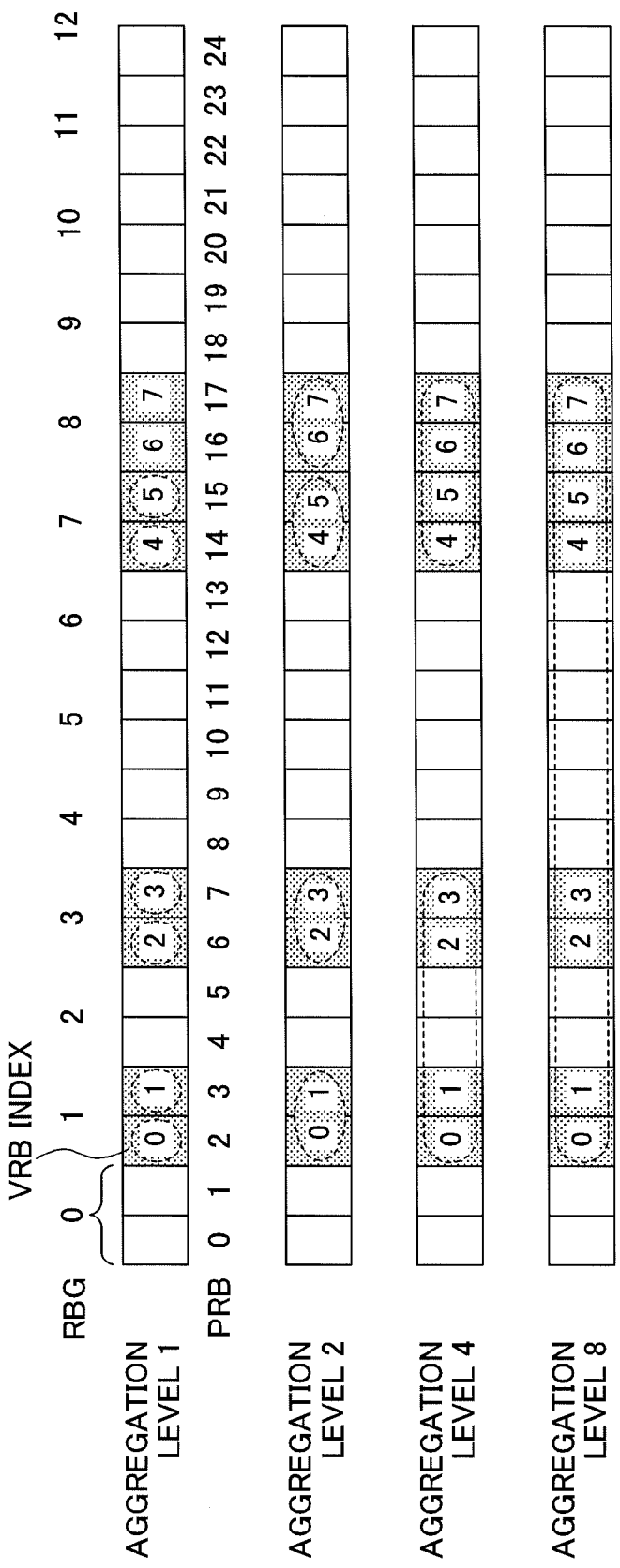
FIG. 6 is a diagram to explain an example of search spaces when the enhanced PDCCH format is "without cross interleaving;"

FIG. 6 shows a case where the numbers of candidate enhanced PDCCHs at aggregation levels $\Lambda$ (=1, 2, 4 and 8) are 6, 6, 2 and 2. Note that, although a case is shown here where the numbers of candidate enhanced PDCCHs corresponding to the aggregation levels are 6, 6, 2 and 2, the aggregation levels and the number of candidate enhanced PDCCHs are by no means limited to these.

At aggregation level 1, six search spaces are set in VRBs #0 to #5. At aggregation level 2, four search spaces are set in VRBs #0 to #7 in units of two VRBs. At aggregation level 4, two search spaces are set in VRBs #0 to #7 in units of four VRBs. At aggregation level 8, one search space is set in VRBs #0 to #7 in units of eight VRBs. Note that, at aggregation levels 2 and 8, search spaces overlap due to shortage of the number of VRBs.

A user terminal performs blind decoding in search spaces depending on the aggregation level, and acquires downlink control information (DCI) that is allocated to the VRBs. In this way, in the event of "without cross interleaving," downlink control signals for individual users are allocated in PRB units, and blind decoding is performed in search spaces that are defined with VRB indices.

However, with a method of allocating downlink control signals to enhanced PDCCHs such as described above, not much consideration is given to the fading variation that may be produced when a user terminal moves, or to interference from other cells. In particular, when the aggregation level is low, given that downlink control information is mapped in PRB units, there is a problem that a frequency diversity effect cannot be achieved.

Consequently, the present inventors have studied downlink control signal mapping whereby a frequency diversity effect can be units of groups of neighboring resource blocks, not in units of individual resource blocks in the frequency domain. In FIG. 5, the resource block group (RBG) size is two. The eight VRBs are mapped to PRBs in units of two.

$N_{VRB}$ VRBs are reported from a radio base station apparatus to a user terminal through higher layer signaling. In the case of FIG. 5, predetermined RBGs (RBGs=1, 3, 7 and 8) are reported from the radio base station to the user terminal. Also, the VRBs are numbered with VRB indices, along the frequency direction, from the to smallest PRB index (RBG index).

A resource block (VRB set) for an enhanced PDCCH may assume a configuration in which a DL assignment is arranged in the first-half slot and an UL grant is arranged in the second-half slot. By this means, downlink data signals can be demodulated quickly. Note that the configuration of resource blocks for enhanced PDCCH is by no means limited to this.

Also, when enhanced PDCCHs are demodulated using DM-RSs, a method of allocating each user's downlink control signal in PRB units (without cross interleaving) may be possible as a method of allocating downlink control signals to the enhanced PDCCHs.

In this case, the radio base station apparatus allocates each user terminal's downlink control signal to enhanced PDCCHs in PRB units, and also arranges DM-RSs, which are user-specific downlink reference signals, in radio resources where enhanced PDCCHs may be arranged. Also, a user terminal performs blind decoding in a achieved even when a downlink control channel is enhanced in accordance with the frequency division approach and enhanced PDCCHs are demodulated using DM-RSs, and arrived at the present invention.

Now, an example of a mapping method according to the present embodiment will be described below with reference to FIGS. 7 to 10. Note that mapping according to the present embodiment is by no means limited to the example described below.

Figure 7:
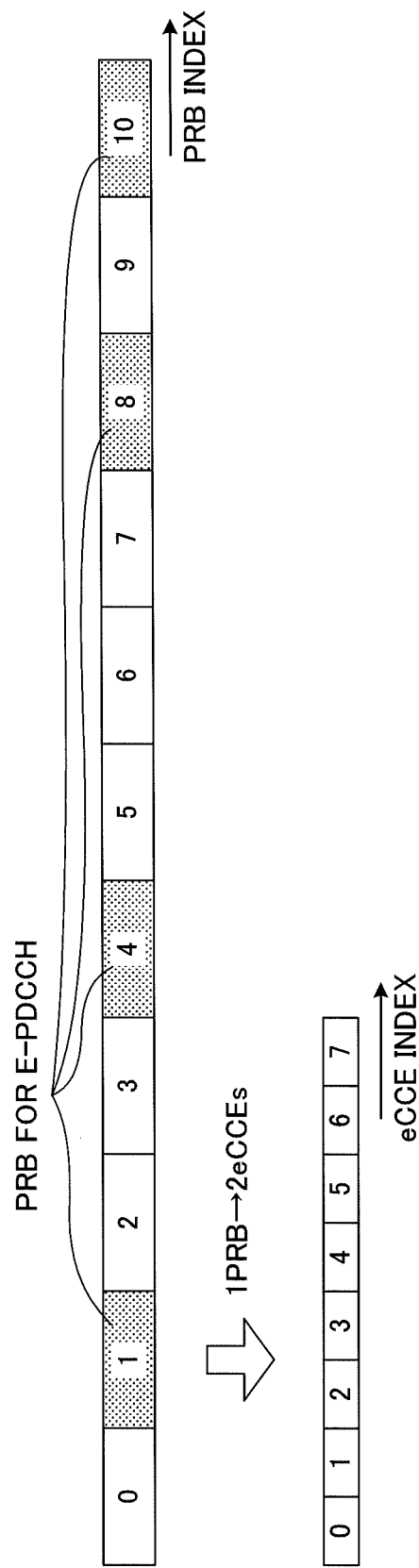
FIG. 7 is a diagram to show the relationship of enhanced channel control elements (eCCEs) to enhanced PDCCHs.

FIG. 7 shows a case where, out of eleven PRBs (PRBs #0 to #10), four PRBs (PRBs #1, #4, #8 and #10) serve as second control regions—that is, four PRBs are allocated as enhanced PDCCHs. With the present embodiment, resource blocks to constitute the second control regions are formed with control channel elements, which serve as a downlink control information allocation unit. For example, FIG. 7 shows a case where two control channel elements are included in one PRB.

Note that the number of control channel elements to constitute one PRB is not limited to two, and may as well be other numbers (for example, four). Also, in the following description, in order to make clear distinction from control channel elements to be applied to an existing PDCCH, control channel elements to be applied to enhanced PDCCHs will be referred to as "enhanced control channel elements" (eCCEs). In the present embodiment, one eCCE is the unit of allocation of downlink control information, and search spaces are defined using one eCCE as the fundamental unit.

As shown in FIG. 7, four PRBs are used as enhanced PDCCHs, and also, when one PRB is formed with two eCCEs, a plurality of second control regions are formed with a total of eight eCCEs. Also, in FIG. 7, eCCEs are numbered with index numbers, along the frequency direction, in order from the smallest PRB index.

With the present embodiment, eCCEs to constitute PRBs are divided and mapped such that the divided eCCEs are distributed over a plurality of second control regions of varying frequency bands. By this means, when downlink control signals are transmitted using to enhanced PDCCHs, it is possible to demodulate enhanced PDCCHs using DM-RSs and also achieve a frequency diversity effect. Now, the mapping method will be described below in detail with reference to FIG. 8.

First, as shown in FIG. 8A, the radio base station apparatus numbers eCCEs in order from the smallest PRB index. After that, the radio base station apparatus divides each eCCE (here, eCCEs #0 to #7) into two (see FIG. 8B). When a plurality of eCCEs are included in one PRB, the radio base station apparatus assigns varying index numbers to these eCCEs and then performs the division.

In this case, four eCCEs (for example, eCCEs #0, #0, #1 and #1) correspond to one PRB. Note that, although a case is shown here with the present embodiment where an eCCE is divided into two, an eCCE may be divided into a greater number than two.

Next, the divided eCCEs (combinations of eCCEs having the same index numbers) are distributed over a plurality of virtual resource regions (VPRBs #1 to #4) (see FIG. 8C). That is, eCCE pairs to which the same index numbers are assigned are mapped to varying virtual resource regions.

For example, a plurality of eCCEs, to which index numbers are assigned along the frequency direction, are mapped to a plurality of virtual resource regions (VPRBs #1 to #4), in order of the index numbers. Here, two eCCEs #0 are mapped to VPRBs #1 and #2, and two eCCEs #1 are mapped to VPRBs #3 and #4. Similarly, two eCCEs #2 are mapped to VPRBs #1 and #2, and two eCCEs #3 are mapped to VPRBs #3 and #4. eCCEs #5 and #6 are also mapped in the same way. The numbers of a plurality of virtual resource regions can be determined assuming that they are aligned along the frequency direction.

Next, a plurality of virtual resource regions (VPRBs #1 to #4), to which the eCCEs have been mapped, are interleaved, and are allocated to a plurality of second control regions (PRBs #1, #4, #8 and #10) (see FIG. 8D). Here, a case is shown where VPRBs having odd-numbered indices are mapped to PRBs first and then VPRBs having even-numbered indices are mapped to PRBs, so that VPRB #1 is allocated to PRB #1, VPRB #2 is allocated to PRB #8, VPRB #3 is allocated to PRB #4, and VPRB #4 is allocated to PRB #10.

By interleaving virtual resource regions after eCCEs have been mapped, it is possible to expand the frequency intervals between eCCE pairs to which the same index numbers are assigned, so that a frequency diversity effect can be achieved more effectively.

Note that, although FIG. 8 shows a case of employing a PRB-based mapping method, the present embodiment is by no means limited to this. Apart from this, mapping may be performed based on resource block groups (RBGs) as well. Now, an RBG-based mapping method will be described below with reference to FIGS. 9 and 10.

FIG. 9 shows a case where the RBG size is two and where four RBGs are assigned as enhanced PDCCHs (for example, the case shown in FIG. 6). An RBG is the resource block signaling unit, and, in FIG. 9, one RBG corresponds to two PRBs. Consequently, when it is defined that two eCCEs are included in one PRB, a plurality of second control regions are formed with sixteen eCCEs. That is, one RBG matches four eCCEs. Now, the mapping method will be described below.

First, as shown in FIG. 9A, a radio base station apparatus numbers eCCEs, in order from the smallest RBG index, along the frequency direction, and then divides each eCCE (here, eCCEs #0 to #15) into two (see FIG. 9B). When one eCCE is divided into two, eight eCCEs correspond to one RBG (for example, eCCEs #0, #0, #1, #1, #2, #2, #3 and #3).

Next, the divided eCCEs are distributed over a plurality of virtual resource regions (VRBGs #1 to #4) (see FIG. 9C). That is, eCCEs to which the same index numbers are assigned are mapped to varying virtual resource regions.

For example, a plurality of eCCEs are mapped to a plurality of virtual resource regions (VRBGs #1 to #4), in order of the index numbers. Here, two eCCEs #0 are mapped to VRBGs #1 and #2, and two eCCEs #1 are mapped to VRBGs #3 and #4. The rest of eCCEs #2 to #15 are also mapped in the same way.

Next, a plurality of virtual resource regions (VRBGs #1 to #4), to which the eCCEs have been mapped, are interleaved, and are allocated to a plurality of second control regions (for example, RBGs #1, #3, #7 and #8 shown in FIG. 6) (see FIG. 9D). Here, a case is shown where VRBGs having odd-numbered indices are mapped to PRBs first and then VRBGs having even-numbered indices are mapped to PRBs, so that VRBG #1 is allocated to RBG #1, VRBG #2 is allocated to RBG #7, VRBG #3 is allocated to PRB #3, and VRBG #4 is allocated to PRB #8. By this means, it is possible to expand the frequency intervals between eCCE pairs to which the same index numbers are assigned, so that a frequency diversity effect can be achieved more effectively.

FIG. 10 shows a case where the RBG size is three (one RBG corresponds to three PRBs) and where three RBGs are allocated as enhanced PDCCHs. When two eCCEs are included in one PRB, a plurality of second control regions are formed with eighteen eCCEs. Now, the mapping method will be described below.

First, as shown in FIG. 10A, the radio base station apparatus numbers eCCEs, in order from the smallest RBG index, along the frequency direction, and then divides each eCCE (here, eCCEs #0 to #17) into two (see FIG. 10B). When one eCCE is divided into two, twelve eCCEs correspond to one RBG.

Next, the divided eCCEs are distributed over a plurality of virtual resource regions (VRBGs #1 to #3) (see FIG. 10C). That is, eCCEs to which the same index numbers are assigned are mapped to varying virtual resource regions.

For example, a plurality of eCCEs are mapped to a plurality of virtual resource regions (VRBGs #1 to #3), in order of the index numbers. Here, two eCCEs #0 are mapped to VRBGs #1 and #2, and two eCCEs #1 are mapped to VRBGs #3 and #1. The rest of eCCEs #2 to #17 are also mapped in the same way.

Next, a plurality of virtual resource regions (VRBGs #1 to #3), to which the eCCEs have been mapped, are interleaved, and allocated to a plurality of second control regions (RBGs #1, #2 and #3) (see FIG. 10D). Here, a case is shown where VRBG #1 is allocated to RBG #1, VRBG #2 is allocated to RBG #3, and VRBG #3 is allocated to PRB #2. By this means, it is possible to expand the frequency intervals between eCCE pairs to which the same index numbers are assigned, so that a frequency diversity effect can be achieved more effectively.

Figure 11:
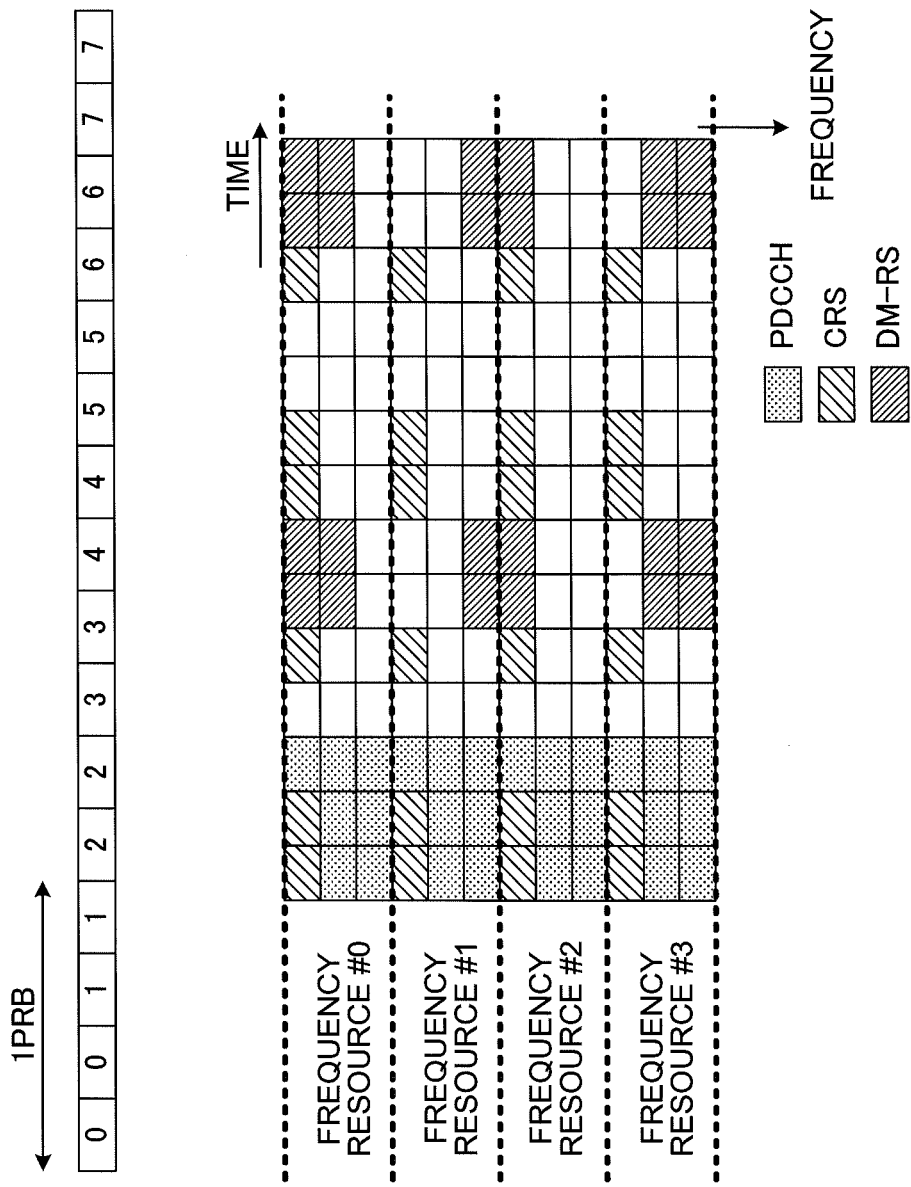
FIG. 11 is a diagram to show an example of a subframe configuration in which a plurality of enhanced channel control elements are frequency-division-multiplexed over PRBs.

In the above-described mapping method, as a method of multiplexing a plurality of eCCEs to map to one PRB, frequency multiplexing, time multiplexing, space multiplexing, code division multiplexing, and so on may be applied. FIG. 11 shows a case where frequency-division-multiplexing is performed as an example of a method of multiplexing a plurality of eCCEs over one PRB. Note that FIG. 11 shows a case where, as shown in FIG. 8 above, two eCCEs are each divided into two and mapped to one PRB.

In the event of frequency-division-multiplexing, a configuration to allocate eCCEs to frequency resources #0 to #3, which are divided into four every three subcarriers along the frequency direction, may be used. In FIG. 11, an existing PDCCH is allocated from the top of the subframe to the third OFDM symbol, and enhanced PDCCHs are allocated to radio resources from the fourth OFDM symbol onward.

Also, reference signals such as CRSs, DM-RSs and so on are allocated to the radio resources. Consequently, cases might occur where the number of radio resources (the number of resource elements) that can be used for eCCEs varies in each region of frequency resources #0 to #3. In FIG. 11, the number of radio resources that can be used for allocation of downlink control signals is the same (twenty-one resource elements) between frequency resource #0 and frequency resource #3, and the number of radio resources that can be used for allocation of downlink control signals is the same (twenty-five resource elements) between frequency resource #1 and frequency resource #2.

In this case, between frequency resources #0 and #3, and frequency resources #1 and #2, the number of radio resources that can be used for allocation of downlink control signals varies. From the perspective of processing for eCCEs such as coding, it is preferable to make the number of radio resources to be available for use equal between eCCEs of varying index numbers.

So, with the present embodiment, it is preferable to control the positions where combinations of eCCEs (eCCE pairs of the same index numbers) are mapped such that the difference in the number of radio resources to be available for use becomes smaller between eCCEs of varying index numbers. In the case shown in FIG. 11, mapping is controlled such that one of two eCCEs having the same index number is allocated to frequency resource #0 or #3, and the to other one is allocated to frequency resource #1 or #2.

For example, in FIG. 8C, if the eCCEs for VPRB #1 are "eCCEs #0, #2, #4 and #6," in the order of their allocation positions, the eCCEs for VPRB #2 are "eCCEs #2, #0, #6 and #4," in the order of their allocation positions. By this means, one of eCCEs #0 is allocated to frequency resource #0 and the other one is allocated to frequency resource #1. Also, one of eCCEs #2 is allocated to frequency resource #1 and the other one is allocated to frequency resource #0.

In this way, it is possible to reduce variability between eCCEs due to index numbers by performing mapping for combinations of eCCEs to be allocated to varying frequency resources, taking into account the number of radio resources to be available for use between eCCEs of varying index numbers.

When, as shown in FIG. 11 above, a plurality of eCCEs are frequency-division-multiplexed and mapped to PRBs, cases might occur where downlink control signals for varying user terminals are allocated to a plurality of eCCEs multiplexed in the same PRB (aggregation level 1, and so on). When this occurs, if beam forming is applied, each DM-RS is multiplied by a user terminal-specific beam forming weight, so that it is necessary to assign a DM-RS antenna port for every varying frequency resource. For example, in FIG. 11, one PRB is divided into four, so that four DM-RS antenna ports need to be assigned to one PRB.

Figure 12:
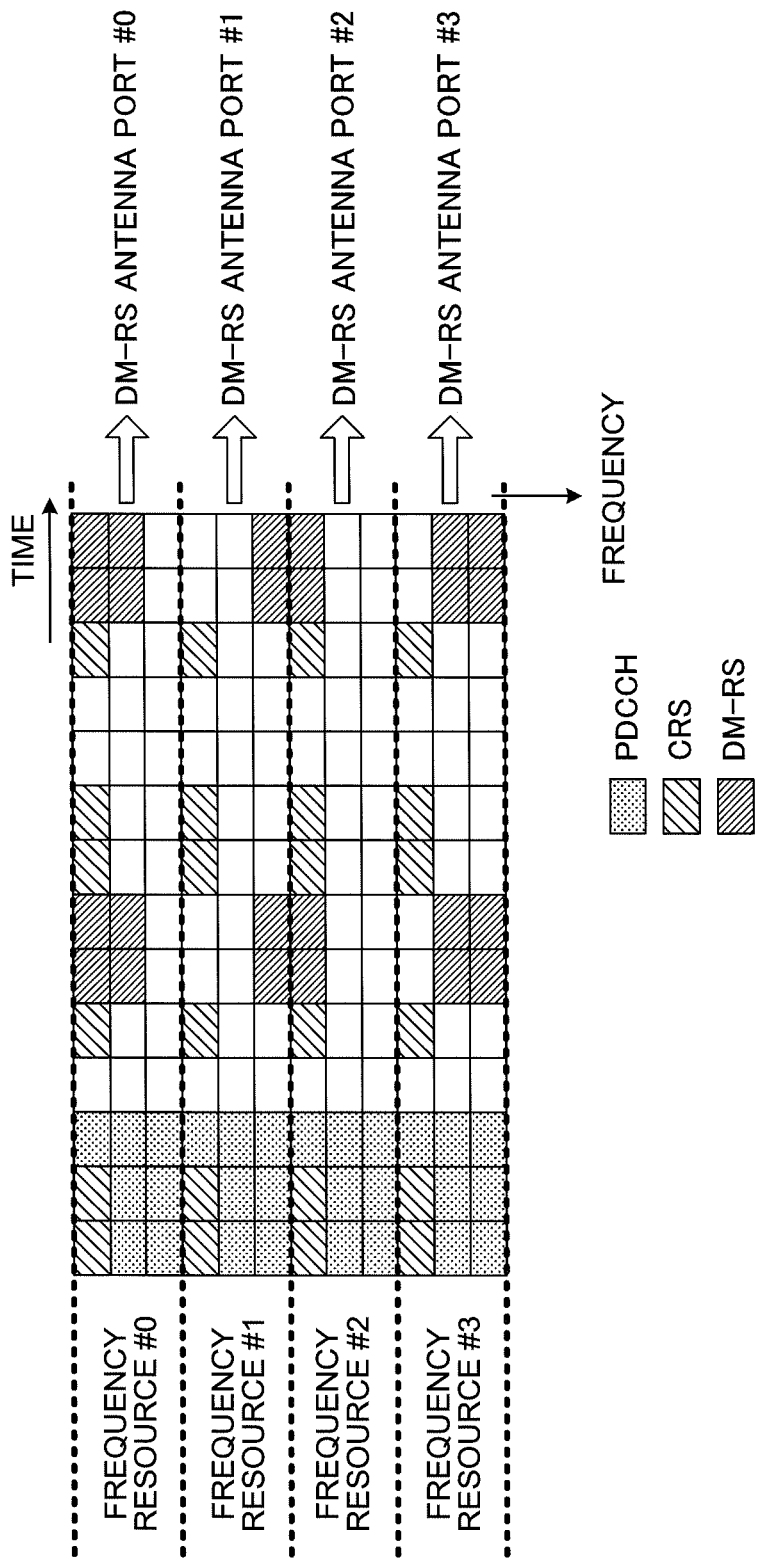
FIG. 12 is a diagram to show the relationship between a plurality of frequency resources that are frequency-divided in PRBs, and DM-RS antenna ports.

So, with the present embodiment, a plurality of DM-RS antenna ports to assign to one PRB, and the index of each frequency resource, are set in association with each other (see FIG. 12). For example, assignment to associate the index of each frequency resource with a specific DM-RS antenna port may be possible. FIG. 12 shows a case of assignment where DM-RS antenna ports #0 to #3 correspond to frequency resources #0 to #3, respectively. Also, the assignment of DM-RS antenna ports may be set to vary between a plurality of PRBs.

In this way, by setting DM-RS antenna ports and the index of each divided resource region in association with each other, it is possible to provide an advantage of not having to report the associations of DM-RS antenna ports and divided resources.

On the other hand, when transmission diversity is applied, a user terminal-specific beam forming weight is not multiplied per DM-RS, so that it is possible to set a DM-RS antenna port for user terminals allocated in one PRB, on a shared basis. In this case, for example, given two transmitting antennas, it is possible to assign DM-RS antenna port 0 to first transmitting antenna #0 and assign DM-RS antenna port 1 to second transmitting antenna #1.

Figure 13:
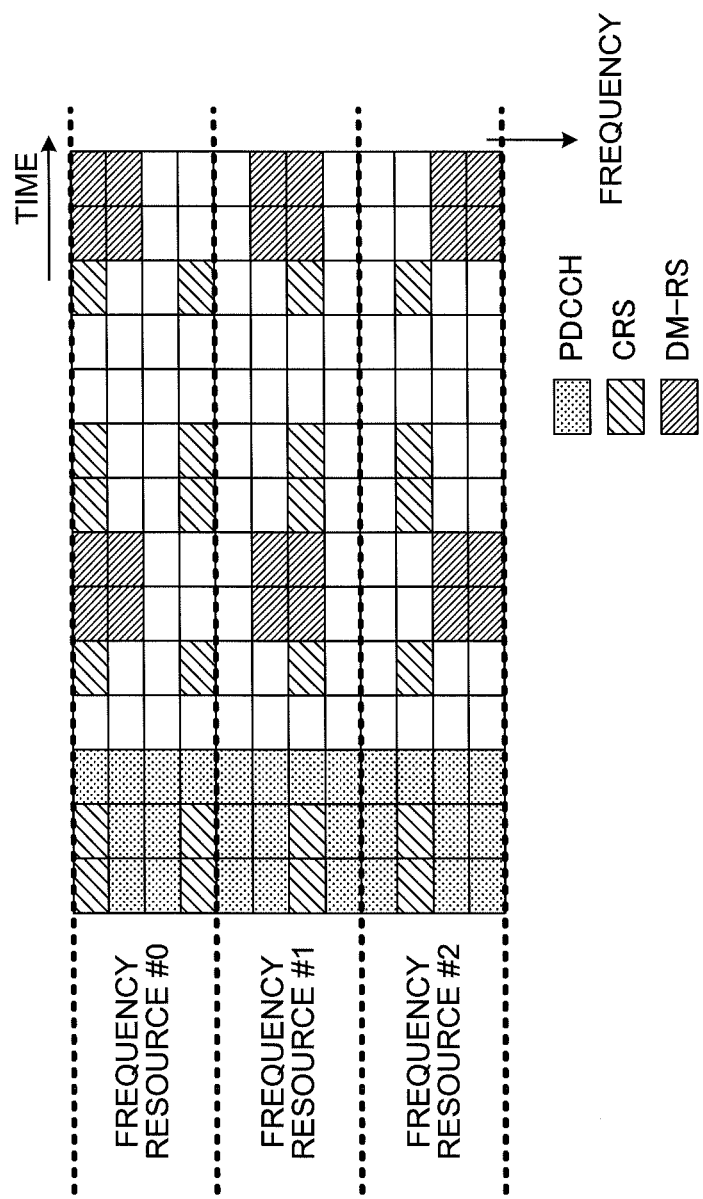
FIG. 13 is a diagram to show an example of a subframe configuration in which a plurality of enhanced channel control elements are frequency-division-multiplexed over PRBs.

FIG. 13 shows a case where one eCCE is divided into three and mapped to one PRB, as an example of frequency-division-multiplexing.

In such cases of frequency-division-multiplexing, a configuration to allocate eCCEs to frequency resources #0 to #2, which are divided into three every four subcarriers along the frequency direction, may be used. In FIG. 13, an existing PDCCH is allocated from the first to the third OFDM symbols in the subframe, and enhanced PDCCHs are allocated to radio resources from the fourth OFDM symbol onward.

Also, reference signals such as CRSs, DM-RSs and so on are assigned to the radio resources. Note that, although, when one PRB is divided into three, it is necessary to assign three DM-RS antenna ports to one PRB, three or more DM-RSs are assigned in each region of frequency resources #0 to #2, as shown in FIG. 13. Consequently, in this case, it is possible to include DM-RS antenna ports #0 to #2 in each frequency resource.

Note that, although a cases of frequency-division-multiplexing a plurality of eCCEs over PRB has been described using FIG. 11 to FIG. 13 with the present embodiment, this is by no means limiting, and it is equally possible to use the method used with respect to frequency-division-multiplexing adequately even when time division multiplexing, space multiplexing, and code multiplexing are applied.

Next, a method of dividing eCCEs to constitute PRBs along the time direction and mapping the divided eCCEs such that the divided eCCEs are distributed over a plurality of second control regions of varying frequency bands will be described. Here, a mapping method in a case of dividing one eCCE into two between slots will be described in detail with reference to FIG. 14. FIG. 14 shows a case where four PRBs are used as enhanced PDCCHs and where furthermore one PRB is formed with four eCCEs. In this case, a plurality of second control regions are formed with a total of sixteen eCCEs.

Figures 14A, 14B, 14C:
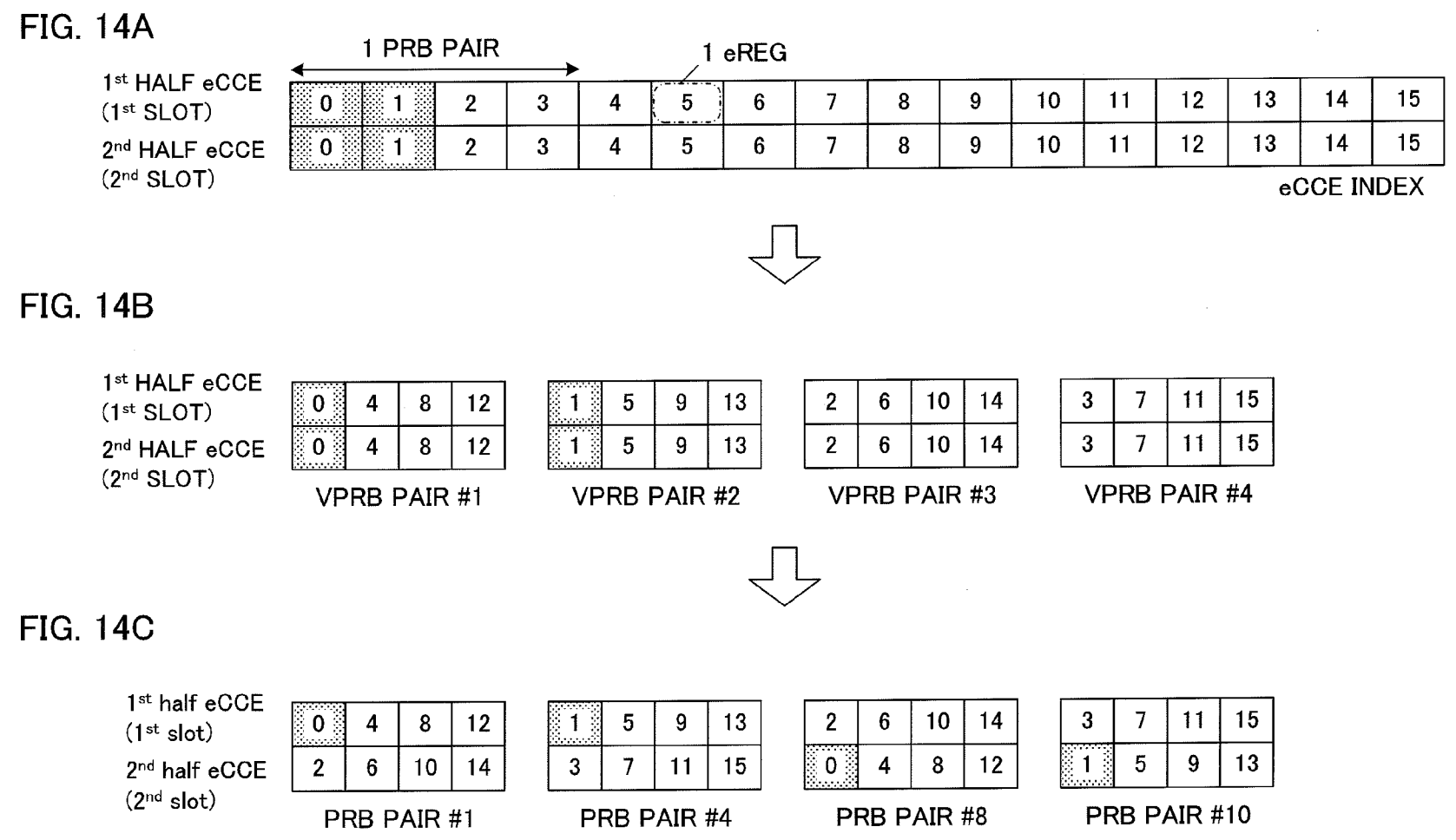

First, as shown in FIG. 14A, a radio base station apparatus numbers eCCEs along the frequency direction, in order from the smallest PRB index, and then divides each eCCE (here, #0 to #15) into two between slots.

In this case, four eCCEs (for example, eCCEs #0, #1, #2 and #3) correspond to one PRB pair. An eCCE is formed with a first-division eCCE (for example, the first-half slot part of the eCCE) and a second-division eCCE (for example, the second-half slot part of the eCCE). For example, this one divided eCCE may be referred to as "1eREG."

Next, the divided eCCEs are mapped to a plurality of virtual resource region pairs (VPRB pairs #1 to #4), repeating the sequence of the index numbers (see FIG. 14B). Here, eCCE #0 is mapped to VPRB pair #1, eCCE #1 is mapped to VPRB pair #2, eCCE #2 is mapped to VPRB pair #3, and eCCE #3 is mapped to VPRB pair #4. eCCEs #4 to #15 are also mapped in the same way.

Next, a plurality of virtual resource regions (VPRB pairs #1 to #4), to which the eCCEs have been mapped, are allocated to a plurality of second control regions (PRB pairs #1, #4, #8 and #10) (see FIG. 14C). Here, with respect to the first-division eCCE sets (sets of the divided eCCEs mapped to the first-half slots of the VPRB pairs), a case of mapping is shown where VPRB #1 is allocated to the first-half slot of PRB pair #1, VPRB #2 is allocated to the first-half slot of PRB pair #4, VPRB #3 is allocated to the first-half slot of PRB pair #8, and VPRB #4 is allocated to the first-half slot of PRB pair #10. Meanwhile, with respect to the divided second-division eCCE sets (sets of the divided eCCEs mapped to the second-half slots of the VPRB pairs), a case of mapping is shown where VPRB #1 is allocated to the second-half slot of PRB pair #8, VPRB #2 is allocated to the second-half slot of PRB pair #10, VPRB #3 is allocated to the second-half slot of PRB pair #1, and VPRB #4 is allocated to the second-half slot of PRB pair #4, each with a cyclic shift through two PRBs.

Generally speaking, when the number of divisions of eCCEs along the time direction is X (X≥2), if the number of PRBs (or the number of RBGs) is N (N≥2), the X-th-division eCCE set is shifted through N/X PRBs (RBGs) and mapped. Consequently, in the example shown in FIG. 14, the second-division eCCE sets are shifted through two PRBs (N=4, X=2, N/X=2) and mapped.

By this means, it is possible to expand the frequency intervals between eCCEs to which the same index numbers are assigned, so that a frequency diversity effect can be achieved more effectively.

Figure 15:
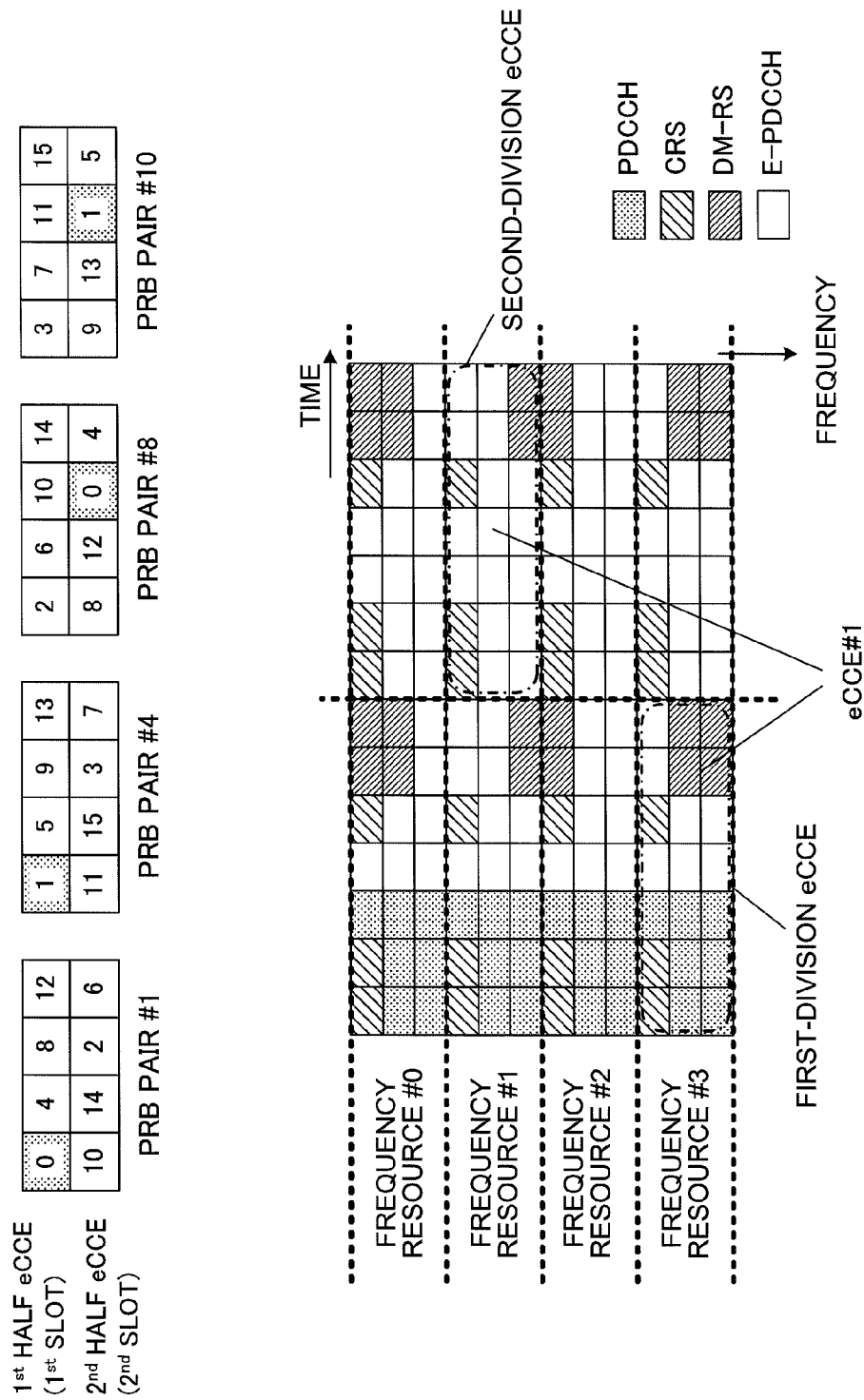
FIG. 15 is a diagram to show an example of a subframe configuration in which a plurality of enhanced channel control elements are frequency-divided and time-division-multiplexed over PRBs.

In the above-described mapping method, as a method of multiplexing a plurality of eCCEs to map to one PRB, frequency multiplexing, time multiplexing, space multiplexing, code division multiplexing, and so on may be applied. FIG. 15 shows a case of frequency division and time division multiplexing, as an example of a method of multiplexing a plurality of eCCEs over one PRB. Note that FIG. 15 shows a case where, as shown in FIG. 14, four eCCEs are each divided into two between slots and mapped to one PRB.

In the event of frequency division and time division multiplexing, a configuration to allocate eCCEs to frequency resources #0 to #3, which are divided into four every three subcarriers along the frequency direction, and which are furthermore each divided into two along the time direction, may be used. In FIG. 15, an existing PDCCH is allocated from the first to the third OFDM symbols in the subframe, and enhanced PDCCHs are allocated to radio resources from the fourth OFDM symbol onward.

For example, the divided eCCE for eCCE #0 and the divided eCCE for #10 in PRB pair #1 are allocated to the first-half slot and the second-half slot in frequency resource #0, respectively. The divided eCCE for eCCE #4 and the divided eCCE for #14 in PRB pair #1 are allocated to the first-half slot and the second-half slot in frequency resource #1, respectively. The rest of the eCCEs in PRB pair #1 are also allocated to the first-half slot and the second-half slot in frequency resources #2 and #3 likewise.

Also, reference signals such as CRSs, DM-RSs and so on are allocated to the radio resources. Consequently, cases might occur where the number of radio resources (the number of resource elements) that can be used for eCCEs varies in each region of frequency resources #0 to #3. In FIG. 15, the number of radio resources that can be used for allocation of downlink control signals is the same between frequency resource #0 and frequency resource #3 (seven resource elements for the first-half slots and fourteen resource elements for the second-half slots), and the number of radio resources that can be used for allocation of downlink control signals is the same between frequency resource #1 and frequency resource #2 (nine resource elements for the first-half slots and sixteen resource elements for the second-half slots).

Meanwhile, between frequency resources #0 and #3, and frequency resources #1 and #2, the number of radio resources that can be used for allocation of downlink control signals varies. From the perspective of processing for eCCEs such as coding, it is preferable to make the number of radio resources to be available for use equal between eCCEs of varying index numbers.

So, with the present embodiment, it is preferable to control the positions to which combinations of eCCEs (eCCEs in which the index numbers of the first-division eCCE and the second-division eCCE are the same) are mapped such that the difference in the number of radio resources to be available for use becomes smaller between eCCEs of varying index numbers. In the case shown in FIG. 15, mapping is controlled such that one of eCCEs, between which the index numbers of the first-division eCCE and the second-division eCCE are the same, is allocated to frequency resource #0 or #3, and the other one is allocated to frequency resource #1 or #2.

For example, in FIG. 15, when eCCEs #0 and #10 in PRB pair #1 are allocated to frequency resource #0, eCCEs #10 and #0 in PRB pair #8 are then allocated to frequency resource #2.

In this way, it is possible to reduce variability between eCCE pairs due to index numbers by performing mapping for combinations of eCCE pairs to be allocated to varying frequency resources, taking into account the number of radio resources to be available for use between eCCE pairs of varying index numbers.

Figure 16:
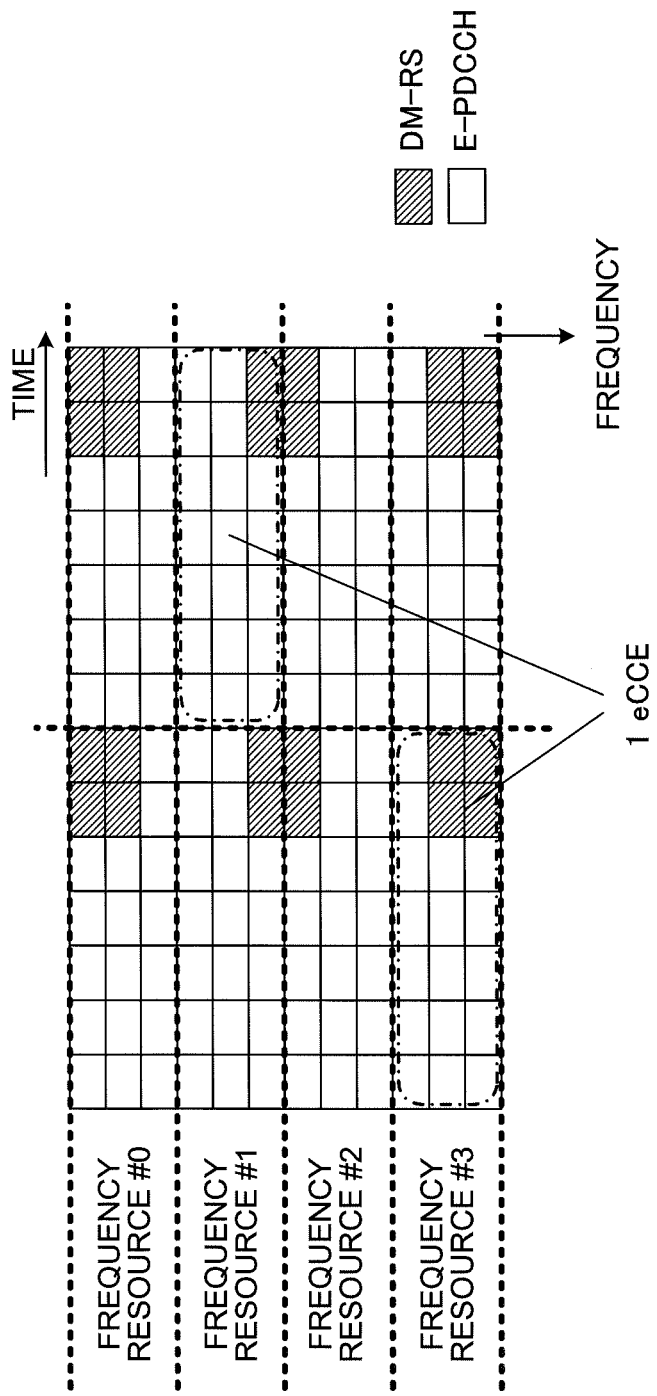
FIG. 16 is a diagram to show another example of a subframe configuration in which a plurality of enhanced channel control elements are frequency-divided and time-division-multiplexed over PRBs.

FIG. 16 shows a case where, in a carrier type (extension carrier) in which no existing PDCCH region is provided in subframes, frequency division and time division multiplexing is performed as an example of a method of multiplexing a plurality of eCCEs over one PRB. Also, in FIG. 16, DM-RSs are assigned to the radio resources. Consequently, cases might occur where the number of radio resources (the number of resource elements) to be available for eCCEs varies in each region of frequency resources #0 to #3.

In this case, from the perspective of processing for eCCEs such as coding, it is preferable to make the number of radio resources to be available for use equal between eCCEs of varying index numbers. For example, in the case shown in FIG. 16, mapping is controlled such that one of the eCCEs, between which the index numbers of the first-division eCCE and the second-division eCCE are the same, is allocated to frequency resource #0 or #3 and the other one is allocated to frequency resource #1 or #2.

Figure 17:
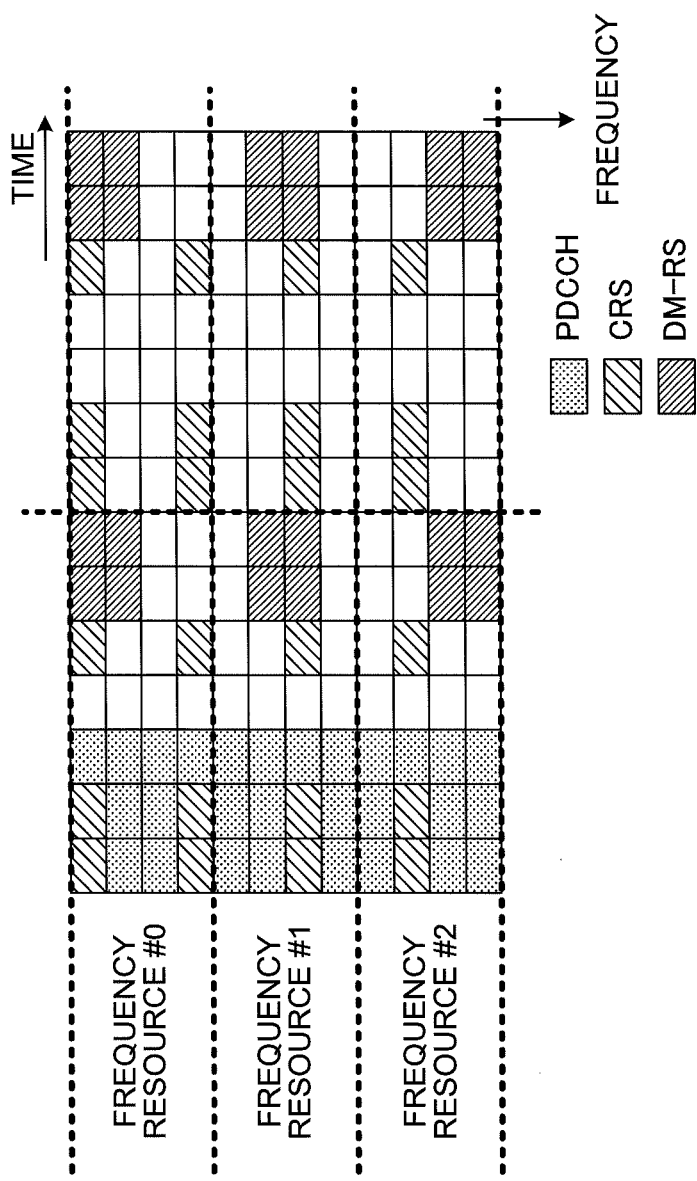
FIG. 17 is a diagram to show another example of a subframe configuration in which a plurality of enhanced channel control elements are frequency-divided and time-division-multiplexed over PRBs.

FIG. 17 shows a case where one PRB is formed with three eCCEs, as an example of frequency division and time division multiplexing. Note that FIG. 17 shows a case where three eCCEs are each divided into two between slots and mapped to one PRB.

In the event of frequency division and time division multiplexing, a configuration to allocate eCCEs to frequency resources #0 to #2, which are divided into three every four subcarriers along the frequency direction, and which are furthermore each divided into two along the time direction, may be used. In FIG. 17, an existing PDCCH is allocated from the first to the third OFDM symbols in the subframe, and enhanced PDCCHs are allocated to radio resources from the fourth OFDM symbol onward.

For example, in FIG. 17, eCCEs in each PRB pair are allocated to the first-half slot and the second-half slot in each frequency resource, respectively.

Also, although a method of mapping divided eCCEs in a distributed manner (distributed mapping) so as to achieve a frequency diversity effect has been shown with the above description, this is by no means limiting. With the present embodiment, in addition to the above-described distributed mapping, it is also possible to apply a method of mapping in a localized manner (localized mapping) so as to achieve a frequency scheduling effect depending on the communication environment and so on.

When the aggregation level is low (aggregation level Λ=1), six consecutive eCCEs (eCCEs #0, #1, #2, #3, #4 and #5) are selected as a search space, and blind decoding is performed in this range. For example, when, as shown in FIG. 7 above, four PRBs are set as enhanced PDCCHs, and six eCCEs are mapped to the corresponding PRBs as is, eCCEs #0 and #1 are allocated to PRB #1, eCCEs #2 and #3 are allocated to PRB #4, and eCCEs #4 and #5 are allocated to PRB #8.

In this case, there is a threat that, even when it is desirable to allocate eCCEs to PRB #10 taking into account the communication environment, and yet it is not possible to make allocation to PRB #10 and therefore sufficient frequency scheduling effect cannot be achieved. Consequently, with the present embodiment, a plurality of eCCEs to constitute one PRB are mapped to PRBs of varying frequency bands.

To be more specific, when the localized mapping method is applied, a plurality of eCCEs included in each enhanced PDCCH are interleaved before mapping to PRBs, and then mapped to varying frequency bands. FIG. 18 shows an example of a case where localized mapping is applied to eCCEs constituting enhanced PDCCHs. Note that FIG. 18 assumes a case where four PRBs are applied as enhanced PDCCHs and where two eCCEs are included in one PRB.

First, as shown in FIG. 18A, eCCEs are numbered with index numbers, along the frequency direction, in order from the smallest PRB index. Next, the eCCEs are interleaved so that eCCEs of continuing index numbers are not arranged in a PRB of the same frequency band (see FIG. 18B).

For example, in order from the smallest index number, a plurality of eCCEs are repeated in order and mapped to a plurality of virtual resource regions that are aligned along the frequency direction. Here, a case is shown where eCCEs #0 and #4 are mapped to VPRB #1, eCCEs #1 and #5 are mapped to VPRB #2, eCCEs #2 and #6 are mapped to VPRB #3, and eCCEs #3 and #7 are mapped to VPRB #4.

Figure 18C:
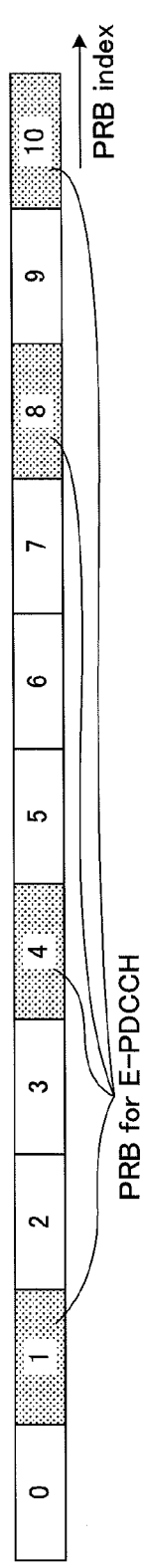
FIG. 18 provides diagrams to show an example of a localized mapping method according to the present embodiment.

Next, a plurality of virtual resource regions, where eCCEs are arranged in a distributed manner, are allocated to a plurality of second control regions (PRBs #1, #4, #8 and #10) (see FIG. 18C). By this means, it is possible to expand the frequency intervals between eCCEs to which consecutive index numbers are assigned, so that a frequency scheduling effect can be achieved.

Figures 19A, 19B:
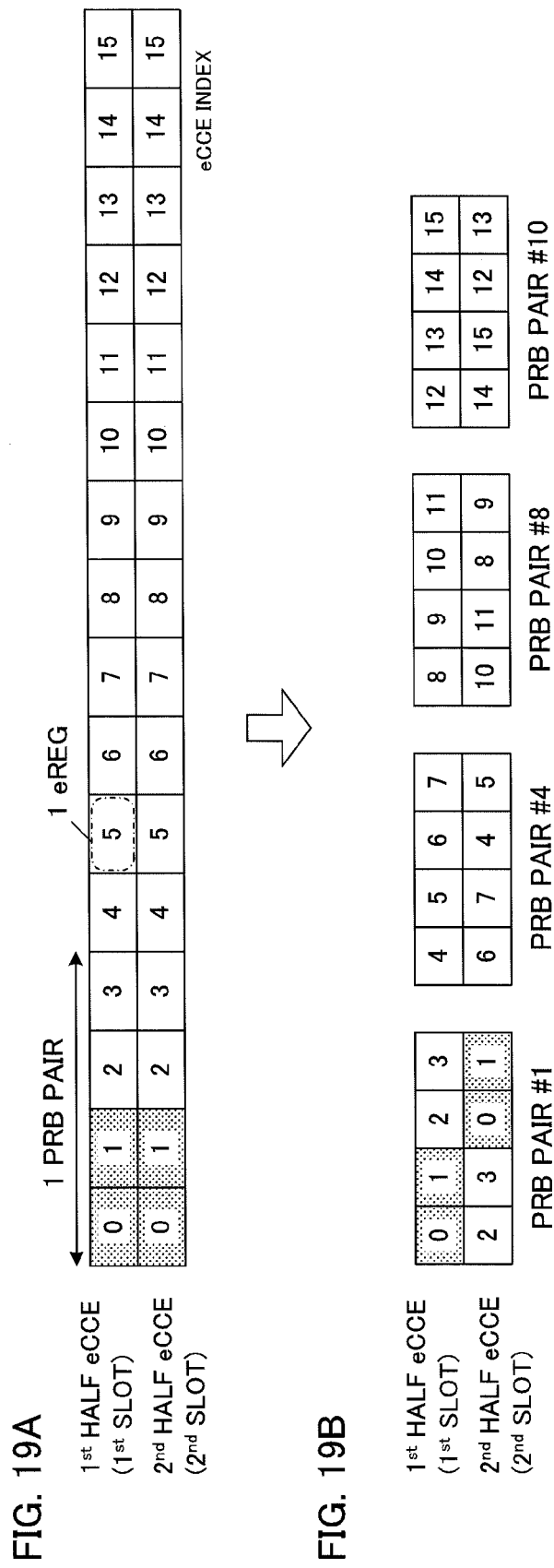
FIG. 19 provides diagrams to show another example of a localized mapping method according to the present embodiment.

FIG. 19 shows an example of a case where localized mapping is performed when four PRBs are used as enhanced PDCCHs and one PRB is formed with four eCCEs. First, as shown in FIG. 19A, eCCEs are numbered along the frequency direction, in order from the smallest PRB index, and then each eCCE (here, #0 to #15) is divided into two between slots.

Next, the divided eCCEs are mapped to a plurality of virtual resource region pairs (VPRB pairs #1 to #4), in order of the index numbers. Here, for example, eCCEs #0 to #3 are mapped to VPRB pair #1, eCCEs #4 to #7 are mapped to VPRB pair #2, eCCEs #8 to #11 are mapped to VPRB pair #3, and eCCEs #12 to #15 are mapped to VPRB pair #4.

Next, a plurality of virtual resource regions (VPRB pairs #1 to #4), to which the eCCEs have been mapped, are allocated to a plurality of second control regions (PRB pairs #1, #4, #8 and #10) (see FIG. 19B). Here, with respect to the first-division eCCE sets (sets of the divided eCCEs mapped to the first-half slots of the VPRB pairs), a case of mapping is shown where VPRB #1 is allocated to the first-half slot of PRB pair #1, VPRB #2 is allocated to the first-half slot of PRB pair #4, VPRB #3 is allocated to the first-half slot of PRB pair #8, and VPRB #4 is allocated to the first-half slot of PRB pair #10. Meanwhile, the divided second-division eCCE sets (sets of the divided eCCEs mapped to the second-half slots of the VPRB pairs) are interleaved and mapped such that the index numbers of the divided second-division eCCE sets differ from those of the first-division eCCEs sets of the first-half slots.

Also, with the present embodiment, it is preferable to switch between distributed mapping and localized mapping on a dynamic basis, taking into account the communication environment (for example, the time and frequency domain channel states). In this case, the mapping method may be selected by using higher layer signaling and so on. Also, it is possible to allow distributed mapping and localized mapping for varying user terminals to be present in a given subframe. By switching between and applying distributed mapping and localized mapping, adequate mapping to suit the communication environment is made possible, so that communication quality can be improved.

(Configuration of Radio Communication System)

Figure 20:
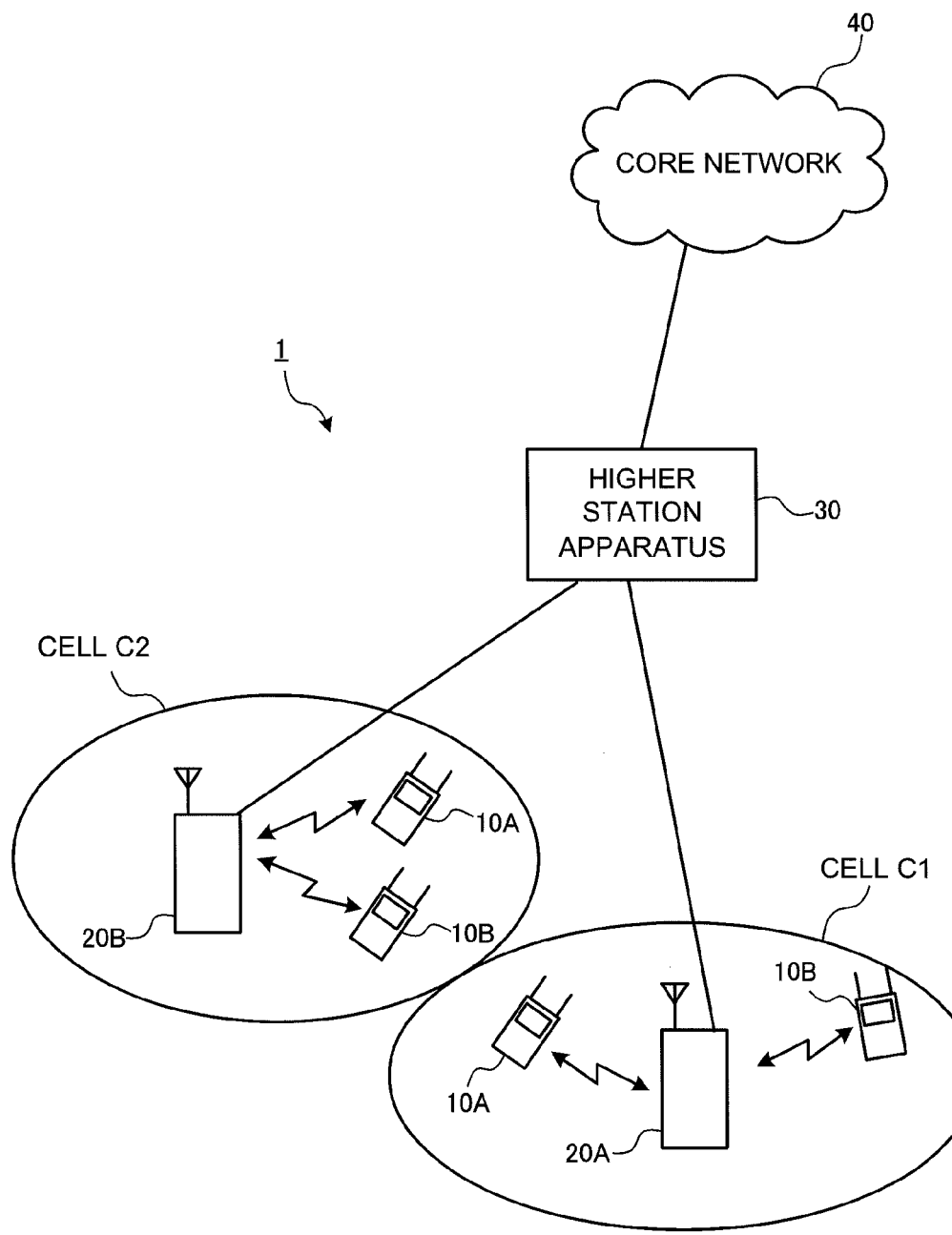
FIG. 20 is a diagram to explain a system configuration of a radio communication system according to an embodiment.

Now, the radio communication system according to the present embodiment will be described in detail below with reference to FIG. 20. FIG. 20 is a diagram to explain a system configuration of a radio communication system according to the present embodiment. Note that the radio communication system shown in FIG. 20 is a system to accommodate, for example, an LTE system or its successor system. This radio communication system uses carrier aggregation, which makes a plurality of fundamental frequency blocks, in which the system band of the LTE system is one unit, as one. Also, this radio communication system may be referred to as "IMT-Advanced" or "4G."

As shown in FIG. 20, a radio communication system 1 is configured to include radio base station apparatus 20, and a plurality of user terminals 10 that communicate with this radio base station apparatus 20. The radio base station apparatus 20 is connected with a higher station apparatus 30, and this higher station apparatus 30 is connected with a core network 40. Also, the radio base station apparatuses 20 are connected with each other by wire connection or by wireless connection. Each of the user terminals 10 (10A, 10B) is able to communicate with the radio base station apparatus 20 in cell C1 or C2. Note that the higher station apparatus 30 may be, for example, an access gateway apparatus, a radio network controller (RNC), a mobility management entity (MME) and so on, but is by no means limited to these.

Although the user terminals 10 may include LTE terminals and LTE-A terminals, the following description will be given simply with respect to user terminals, unless specified otherwise.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, on a per terminal basis, a system band into bands formed with one or continuous resource blocks, and allowing a plurality of terminals to use mutually different bands.

Here, communication channels will be described. Downlink communication channels include a PDSCH (Physical Downlink Shared Channel), which is a downlink data channel used by each user terminal 10 on a shared basis, and downlink L1/L2 control channels (PDCCH, PCFICH, PHICH), and enhanced PDCCHs, which are given by extending the PDCCH. User data and higher control information are transmitted by this PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Scheduling information for the PDSCH and the PUSCH and so on are transmitted by enhanced PDCCHs. The enhanced PDCCHs are used to support the shortage of PDCCH capacity, using resource regions where the PDSCH is allocated.

Uplink communication channels include a PUSCH (Physical Uplink Shared Channel), which is an uplink data channel used by each user terminal on a shared basis, and a PUCCH (Physical Uplink Control Channel), which is an uplink control channel. User data and higher control information are transmitted by means of this PUSCH. Also, by means of the PUCCH, downlink radio quality information (CQI: Channel Quality Indicator), ACK/NACK and so on are transmitted.

Figure 21:
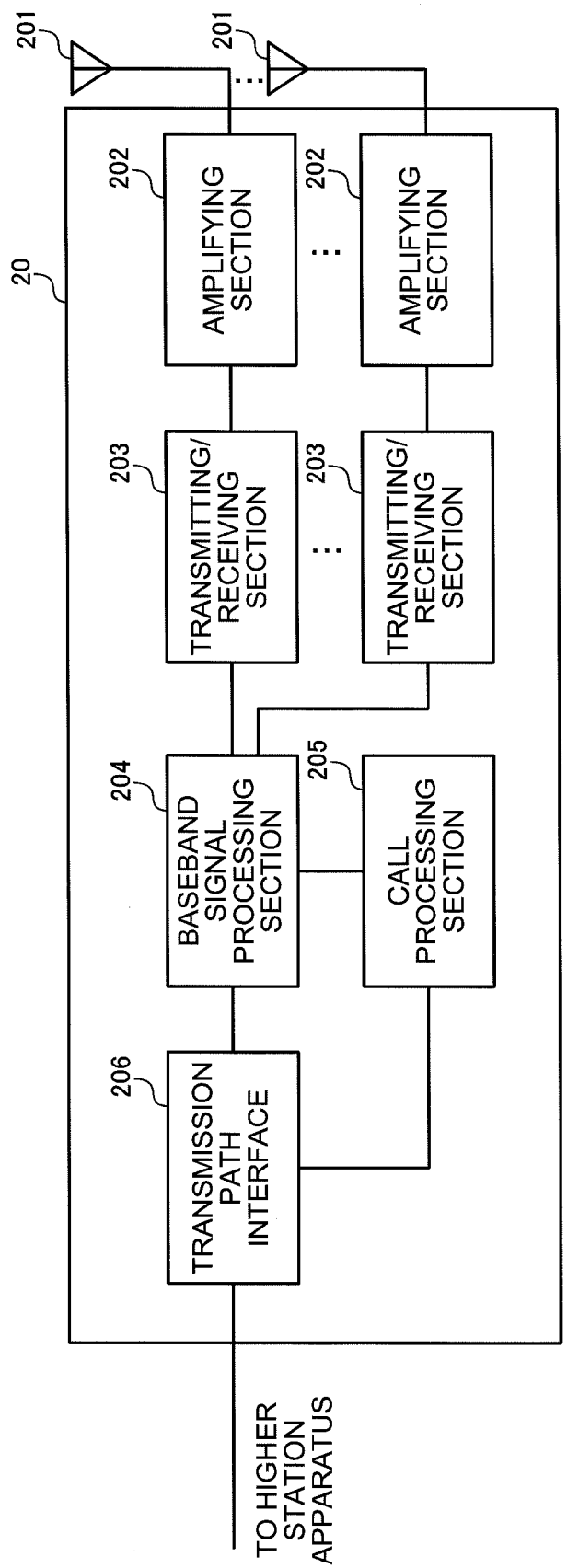
FIG. 21 is a diagram to explain an overall configuration of a radio base station apparatus according to an embodiment.

An overall configuration of the radio base station apparatus according to the present embodiment will be described with reference to FIG. 21. The radio base station apparatus 20 has a plurality of transmitting/receiving antennas 201 for MIMO transmission, amplifying sections 202, transmitting/receiving sections (transmitting sections) 203, a baseband signal processing section 204, a call processing section 205, and a transmission path interface 206.

User data to be transmitted from the radio base station apparatus 20 to the user terminals 10 on the downlink is input from the higher station apparatus 30 into the baseband signal processing section 204, via the transmission path interface 206.

In the baseband signal processing section 204, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process are performed, and the result is transmitted to each transmitting/receiving section 203. Furthermore, signals of downlink control channels are also subjected to transmission processes such as channel coding and an inverse fast Fourier transform, and are transferred to each transmitting/receiving section 203.

Also, the baseband signal processing section 204 reports, to the user terminals 10, control information to allow communication in that cell, by a broadcast channel. Information for communication in the cell includes, for example, the uplink or downlink system bandwidth, resource block information allocated to the user terminals 10, precoding information for precoding in the user terminals 10, identification information of a root sequence (root sequence index) for generating random access preamble signals in the PRACH, and so on. The precoding information may be transmitted via an independent control channel such as the PHICH.

The transmitting/receiving sections 203 convert the baseband signals, which have been subjected to precoding and output from the baseband signal processing section 204 on a per antenna basis, into a radio frequency band. The amplifying sections 202 amplify the radio frequency signals subjected to frequency conversion, and output the results through the transmitting/receiving antennas 201.

Meanwhile, as for data to be transmitted from the user terminals 10 to the radio base station apparatus 20 on the uplink, radio frequency signals received by each transmitting/receiving antenna 201 are amplified in each amplifying section 202, converted into baseband signals through frequency conversion in each transmitting/receiving section 203, and input in the baseband signal processing section 204.

In the baseband signal processing section 204, user data that is included in the baseband signals that are received as input is subjected to an FFT process, an IDFT process, error correction decoding, a MAC retransmission control receiving process, and RLC layer and PDCP layer receiving processes, and is transferred to the higher station apparatus 30 via the transmission path interface 206.

The call processing section 205 performs call processes such as setting up and releasing communication channels, manages the state of the radio base station apparatus 20 and manages the radio resources.

Figure 22:
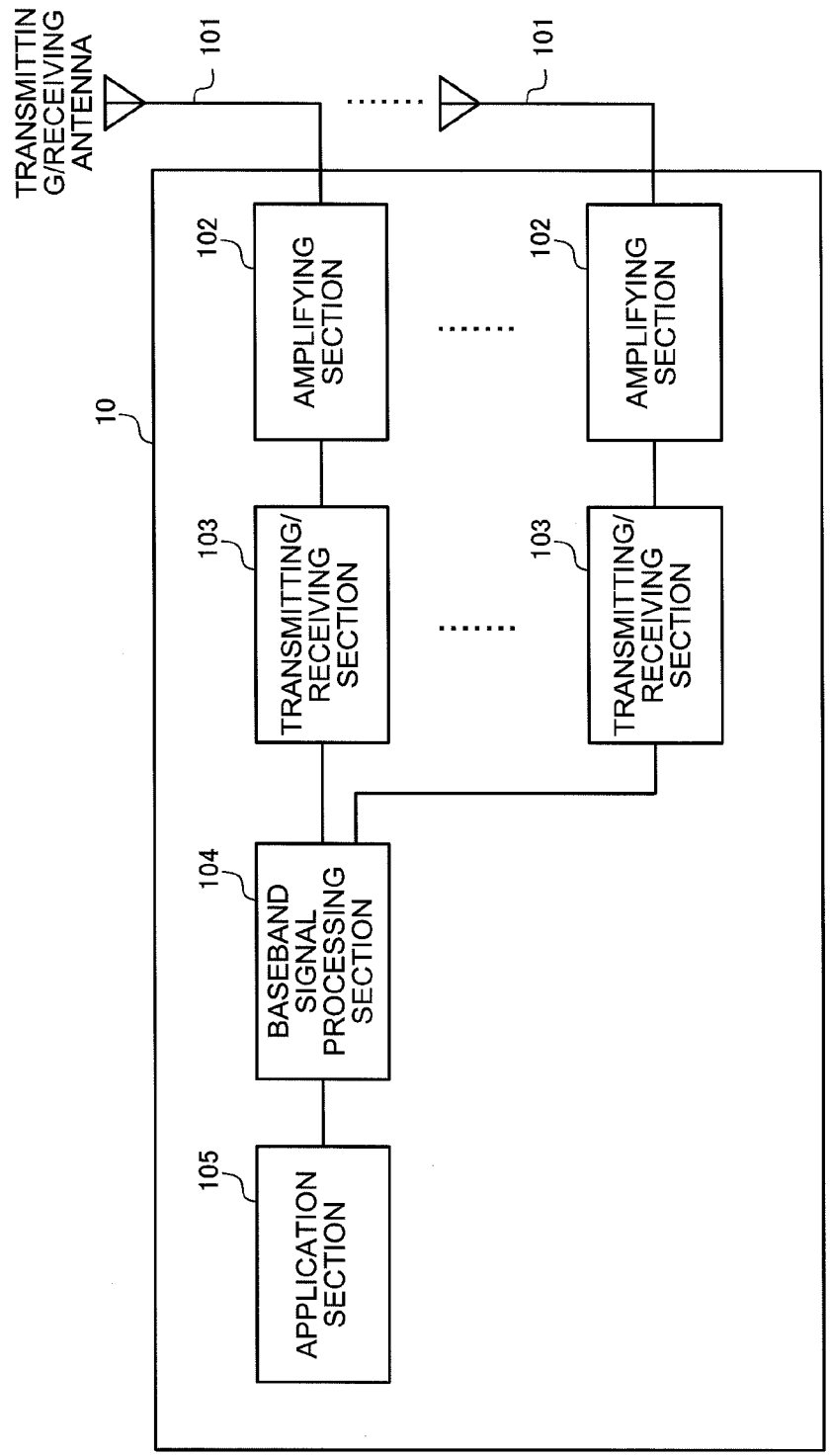
FIG. 22 is a diagram to show an overall configuration of a user terminal according to an embodiment.

Next, an overall configuration of a user terminal according to the present embodiment will be described with reference to FIG. 22. An LTE terminal and an LTE-A terminal have the same hardware configurations in principle parts, and therefore will be described indiscriminately. A user terminal 10 has a plurality of transmitting/receiving antennas 101 for MIMO transmission, amplifying sections 102, transmitting/receiving sections (receiving sections) 103, a baseband signal processing section 104, and an application section 105.

As for downlink data, radio frequency signals received in a plurality of transmitting/receiving antennas 10 are amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, a retransmission control (H-ARQ (Hybrid ARQ)) transmission process, channel coding, precoding, a DFT process, an IFFT process and so on are performed, and the result is transferred to each transmitting/receiving section 103. The baseband signal output from the baseband signal processing section 104 is converted into a radio frequency band in the transmitting/receiving sections 103. After that, the amplifying sections 102 amplify the radio frequency signals having been subjected to frequency conversion, and transmit the results from the transmitting/receiving antennas 101.

Figure 23:
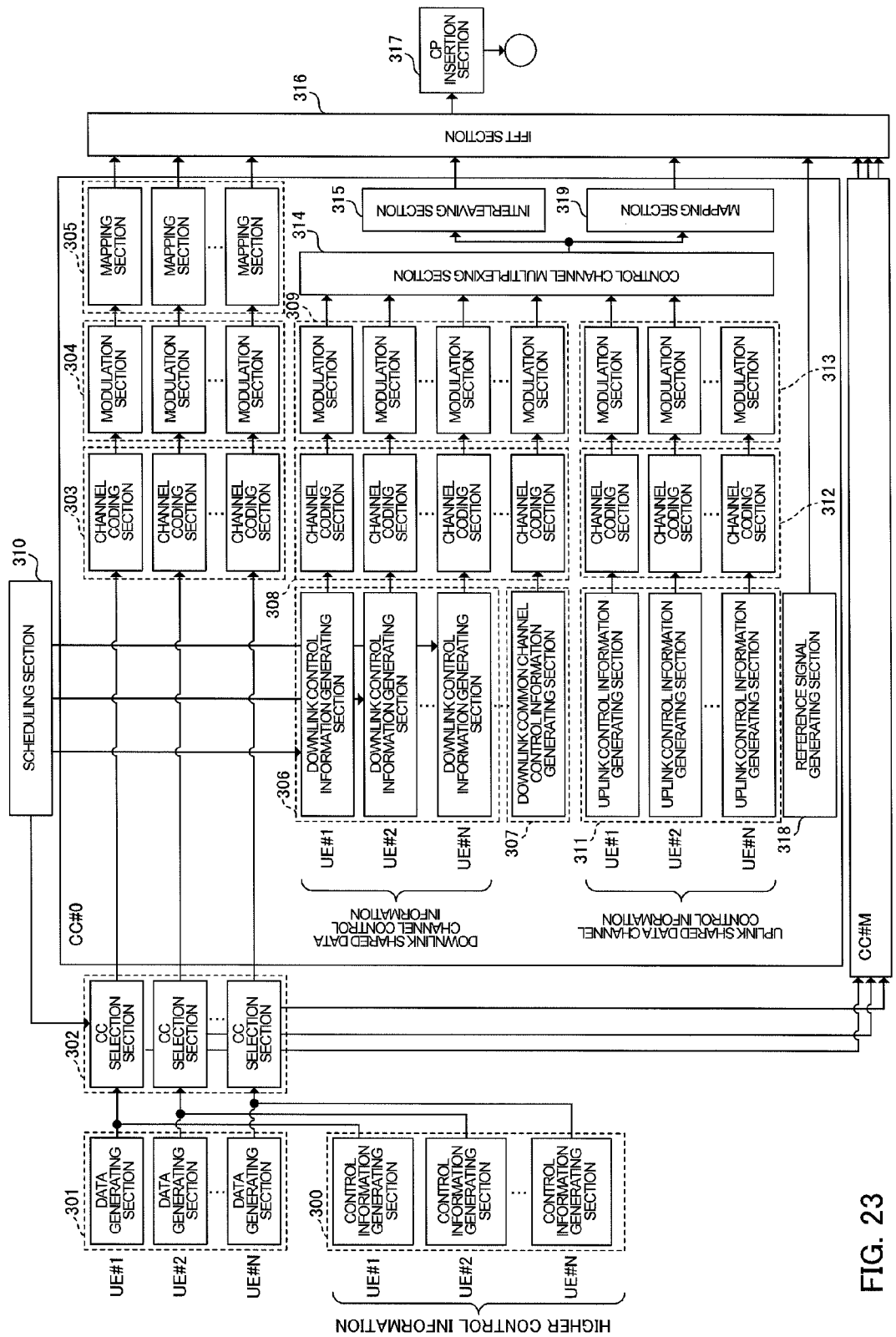
FIG. 23 is a functional block diagram to show a baseband processing section provided in a radio base station apparatus according to an embodiment, and part of higher layers.

FIG. 23 is a functional block diagram of a baseband signal processing section 204 and part of the higher layers provided in the radio base station apparatus 20 according to the present embodiment, and primarily illustrates the function blocks of transmission processing in the baseband signal processing section 204. FIG. 21 illustrates an example of a base station configuration which can support the maximum number of component carriers M (CC #0 to CC #M). Transmission data for user terminals 10 under the radio base station apparatus 20 is transferred from the higher station apparatus 30 to the radio base station apparatus 20.

Control information generating sections 300 generate higher control information for higher layer signaling (for example, RRC signaling), on a per user basis. Also, the higher control information may include resource blocks (PRB positions) where enhanced PDCCHs (FDM-type PDCCHs) can be mapped in advance.

Data generating sections 301 output transmission data transferred from the higher station apparatus 30 as user data separately, on a per user basis. Component carrier selection sections 302 select component carriers to be used for radio communication with the user terminals 10, on a per user basis.

A scheduling section 310 controls allocation of component carriers to the user terminals 10 under control, according to the overall communication quality of the system band. Also, the scheduling section 310 controls resource allocation in component carriers CC #1 to CC #M. An LTE terminal user and an LTE-A terminal user are scheduled separately. The scheduling section 310 receives as input the transmission data and retransmission commands from the higher station apparatus 30, and also receives as input channel estimation values and resource block CQIs from the receiving section having measured uplink received signals.

The scheduling section 310 schedules uplink and downlink control information and uplink and downlink shared channel signals, with reference to the retransmission commands, channel estimation values and CQIs that have been received as input. A propagation path in mobile communication varies differently per frequency, due to frequency selective fading. So, the scheduling section 310 designates resource blocks (mapping positions) of good communication quality, on a per subframe basis, with respect to user data for each user terminal 10 (and this is referred to as "adaptive frequency scheduling"). In adaptive frequency scheduling, a user terminal 10 of good propagation path quality is selected for each resource block. Consequently, the scheduling section 310 designates resource blocks (mapping positions), using the CQI of each resource block, fed back from each user terminal 10.

Likewise, the scheduling section 310 designates resource blocks (mapping positions) of good communication quality, on a per subframe basis, with respect to the control information and so on to be transmitted by enhanced PDCCHs, by adaptive frequency scheduling. Consequently, the scheduling section 310 can designate the resource blocks (mapping positions) using the CQI of each resource block fed back from each user terminal 10.

Also, the scheduling section 310 controls the number of aggregations in accordance with the conditions of the propagation path with the user terminals 10. The scheduling section 310 controls the number of CCE aggregations for the PDCCH, and controls the number of eCCE aggregations for enhanced PDCCHs. The number of CCE aggregations and the number of eCCE aggregations are increased with respect to cell edge users. Also, MCS (coding rate and modulation scheme) that fulfills a required block error rate with the assigned resource blocks is determined. Parameters to fulfill the MCS (coding rate and modulation scheme) determined by the scheduling section 310 are set in channel coding sections 303, 308 and 312, and in modulation sections 304, 309 and 313.

The baseband signal processing section 204 has channel coding sections 303, modulation sections 304, and mapping sections 305, to match the maximum number of users to be multiplexed, N, in one component carrier. The channel coding sections 303 perform channel coding of the downlink shared data channel (PDSCH), formed with user data (including part of higher control signals) that is output from the data generating sections 301, on a per user basis. The modulation sections 304 modulate the user data having been subjected to channel coding, on a per user basis. The mapping sections 305 map the modulated user data to radio resources.

Also, the baseband signal processing section 204 has downlink control information generating sections (generating sections) 306 that generate downlink shared data channel control information, which is user-specific downlink control information, and a downlink common channel control information generating section 307 that generates downlink shared control channel control information, which is user-common downlink control information.

The downlink control information generating sections 306 generate downlink shared data channel control information (DL assignment and so on) for controlling the downlink shared data channel (PDSCH). This downlink shared data channel control information is generated on a per user basis.

The baseband signal processing section 204 has channel coding sections 308 and modulation sections 309 to match the maximum number of users to be multiplexed in one component carrier, N. The channel coding sections 308 perform channel coding of control information generated in the downlink control information generating sections 306 and downlink common channel control information generating section 307, on a per user basis. The modulation sections 309 modulate the downlink control information after channel coding.

Also, the baseband signal processing section 204 has uplink control information generating sections 311, channel coding sections 312, and modulation sections 313. The uplink control information generating sections 311 generate uplink shared data channel control information (UL grant and so on) for controlling the uplink shared data channel (PUSCH). The uplink shared data channel control information is generated on a per user basis.

Control signals that are modulated on a per user basis in the above modulation sections 309 and 313 are multiplexed in a control channel multiplexing section 314. Downlink control signals for an existing PDCCH are multiplexed over the top one to three OFDM symbols in the subframe, and interleaved in an interleaving section 315. On the other hand, downlink control signals for enhanced PDCCHs are allocated to second control regions, which are frequency-divided with data region in the region after a predetermined number of symbols, and mapped to resource blocks (PRBs) by a mapping section (allocation section) 319. In this case, based on commands from the scheduling section 310, the mapping section 319 performs mapping by applying the methods described above using FIGS. 7 to 19.

The mapping section 319 forms a plurality of second control regions, which serve as enhanced PDCCHs, such that each second control region includes a plurality of eCCEs that serve as a unit of allocation of downlink control information, and also divides the eCCEs to which index numbers are assigned, and performs distributed mapping of the divided eCCEs such that the divided eCCEs are distributed over a plurality of second control regions of varying frequency bands.

To be more specific, after having divided the eCCEs with index numbers assigned along the frequency direction, the mapping section 319 maps the eCCEs to a plurality of virtual resource regions that are aligned in the frequency direction, in order of the index numbers, and then interleaves the plurality of virtual resource regions. By this means, the frequency intervals between eCCEs to which the same index numbers are assigned expand, so that a frequency diversity effect can be achieved effectively.

The mapping section 319 forms a plurality of second control regions, which serve as enhanced PDCCHs, such that each second control region includes a plurality of eCCEs that serve as a unit of allocation of downlink control information, and also divide the eCCEs, to which index numbers are assigned, along the time direction, and performs distributed mapping of the divided eCCEs such that the divided eCCEs are distributed over a plurality of second control regions of varying frequency bands.

To be more specific, after having divided the eCCEs with index numbers assigned along the frequency direction, along the time direction, the mapping section 319 maps the divided eCCEs to a plurality of virtual resource regions that are aligned in the frequency direction, in order of the sequence of the index numbers, and then shifts the plurality of virtual resource regions through the amount of shift to match the amount of division. By this means, the frequency intervals between eCCEs to which the same index numbers are assigned expand, so that a frequency diversity effect can be achieved effectively.

A reference signal generating section 318 generates cell-specific reference signals (CRSs), which are used for various purposes such as channel estimation, symbol synchronization, CQI measurement, mobility measurement, and so on. Also, the reference signal generating section 318 generates DM-RSs, which are user-specific downlink demodulation reference signals. DM-RSs are used not only to demodulate user data but are also used to demodulate downlink control information that is transmitted in enhanced PDCCHs.

Also, a precoding weight multiplication section to control (shift) the phase and/or the amplitude of transmission data and user-specific demodulation reference signals (DM-RSs) mapped to subcarriers, may be provided for each of a plurality of antennas. Transmission data and user-specific demodulation reference signals (DM-RS), to which a phase and/or amplitude shift has been applied by the precoding weight multiplication sections, are output to an IFFT section 316.

The IFFT section 316 receives control signals as input from the interleaving section 315 and the mapping section 319, receives user data as input from the mapping sections 305, and receives reference signals as input from the reference signal generating section 318. The IFFT section 316 converts downlink channel signals from frequency domain signals into a time sequence signal by performing an inverse fast Fourier transform. A cyclic prefix insertion section 317 inserts cyclic prefixes in the time sequence signal of the downlink channel signals. Note that a cyclic prefix to functions as a guard interval for cancelling the differences in multipath propagation delay. Transmission data, to which cyclic prefixes have been added, is transmitted to the transmitting/receiving sections 203.

Figure 24:
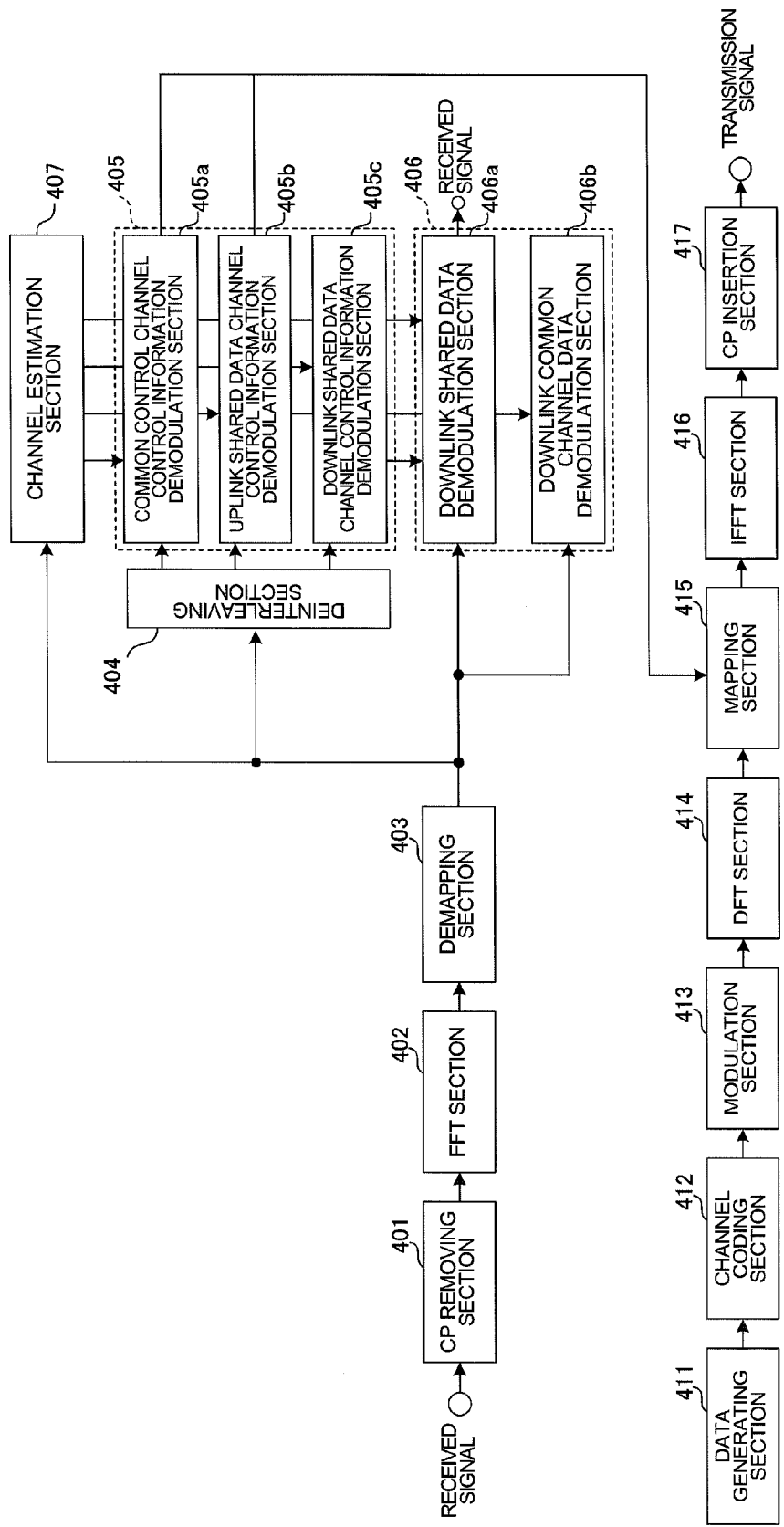
FIG. 24 is a functional block diagram of a baseband processing section of a user terminal according to an embodiment.

FIG. 24 is a functional block diagram of a baseband signal processing section 104 provided in a user terminal 10, illustrating function blocks of an LTE-A terminal which supports LTE-A. First, the downlink configuration of the user terminal 10 will be described.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts multiplex control information, in which a plurality of pieces of control information are multiplexed, user data, and higher control information, from the downlink signal. Note that the demapping process by the demapping section 403 is performed based on higher control information that is received as input from the application section 105. The multiplex control information output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section (demodulation section) 405a that demodulates downlink shared control channel control information from the multiplex control information, an uplink shared data channel control information demodulation section (demodulation section) 405b that demodulates uplink shared data channel control information from the multiplex control information, and a downlink shared data channel control information demodulation section 405c that demodulates downlink shared data channel control information from the multiplex control information. The data demodulation section 406 includes a downlink shared data demodulation section 406a that demodulates user data and higher control signals, and a downlink common channel data demodulation section 406b that demodulates downlink shared channel data.

The shared control channel control information demodulation section 405a extracts shared control channel control information, which is control information that is common between users, by, for example, performing a blind decoding process, a demodulation process, and a channel decoding process of the common search space in the downlink control channel (PDCCH). The shared control channel control information including downlink channel quality information (CQI), is input in a mapping section 415, and is mapped as part of transmission data for the radio base station apparatus 20.

The uplink shared data channel control information demodulation section 405b extracts uplink shared data channel control information (for example, UL Grant), by, for example, performing a blind decoding process, a demodulation process, and a channel decoding process of the user-specific search spaces of the downlink control channel (PDCCH). In this case, in the event of an existing PDCCH, the blind decoding process is performed for a plurality of CCE candidates. Also, in the event of enhanced PDCCHs, the blind decoding process is performed for a plurality of eCCE candidates. The demodulated uplink shared data channel control information is input in the mapping section 415 and is used to control the uplink shared data channel (PUSCH).

The downlink shared data channel control information demodulation section 405c extracts downlink shared data channel control information (for example, DL assignment), by, for example, performing a blind decoding process, demodulation process, and a channel decoding process of the user-specific search spaces of the downlink control channel (PDCCH). In this case, in the event of an existing PDCCH, the blind decoding process is performed for a plurality of CCE candidates. Also, in the event of enhanced PDCCHs, the blind decoding process is performed for a plurality of eCCE candidates. The demodulated downlink shared data channel control information is input in the downlink shared data demodulation section 406a, is used to control the downlink shared data channel (PDSCH), and is input in the downlink shared data demodulation section 406a.

The downlink shared data demodulation section 406a acquires user data, higher control information and so on, based on the downlink shared data channel control information received as input from the downlink shared data channel control information demodulation section 405c. The PRB positions where enhanced PDCCHs can be mapped, included in the higher control information, are output to the downlink shared data channel control information demodulation section 405c. The downlink common channel data demodulation section 406b demodulates the downlink shared channel data based on the uplink shared data channel control information that is input from the uplink shared data channel control information demodulation section 405b.

The channel estimation section 407 performs channel estimation using user-specific reference signals (DM-RSs) or cell-specific reference signals (CRSs). When demodulating an existing PDCCH, channel estimation is performed using the cell-specific reference signals. On the other hand, when demodulating enhanced PDCCHs and user data, channel estimation is performed using DM-RSs, CRSs, and so on. Estimated channel variation is output to the shared control channel control information demodulation section 405a, the uplink shared data channel control information demodulation section 405b, the downlink shared data channel control information demodulation section 405c and the downlink shared data demodulation section 406a. In these demodulation sections, demodulation processes are performed using the estimated channel variation and reference signals for demodulation.

Also, when a plurality of eCCEs for varying users are frequency-division-multiplexed in the same PRB in an enhanced PDCCH, control information is demodulated using the DM-RS antenna ports associated with the index numbers of the frequency resources in the PRB. In this case, the DM-RSs in the same PRB are distinguished between users by the DM-RS transmission weights that vary per user (per eCCE). On the other hand, when transmission diversity is applied, it is possible to set a DM-RS antenna port for user terminals allocated in one PRB, on a shared basis.

The baseband signal processing section 104 has, as function blocks of the transmission processing system, a data generating section 411, a channel coding section 412, a modulation section 413, a DFT section 414, a mapping section 415, an IFFT section 416, and a CP insertion section 417. The data generating section 411 generates transmission data from bit data that is received as input from the application section 105. The channel coding section 412 applies channel coding processing such as error correction to the transmission data, and the modulation section 413 modulates the transmission data after channel coding by QPSK and so on.

The DFT section 414 performs a discrete Fourier transform on the modulated transmission data. The mapping section 415 maps the frequency components of the data symbol after the DFT to subcarrier positions designated by the radio base station apparatus 20. The IFFT section 416 converts input data matching the system band into time sequence data by performing an inverse fast Fourier transform, and the CP insertion section 417 inserts cyclic prefixes in the time sequence data per data division.

As described above, with the radio base station apparatus 20 according to the present embodiment, even when a downlink control channel is enhanced in accordance with the frequency division approach and enhanced PDCCHs are demodulated using DM-RSs, it is possible to reduce the influence of fading variation that is produced by the movement of user terminals and interference from other cells, and achieve a frequency diversity effect.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosures of Japanese Patent Application No. 2011-244006, filed on Nov. 7, 2011, and Japanese Patent Application No. 2012-062821, filed on Mar. 19, 2012, including the specifications, drawings, and abstracts, are incorporated herein by reference in their entirety.

The invention claimed is:

1. A radio base station apparatus comprising:
a processor configured to map an enhanced Physical Downlink Control Channel (enhanced PDCCH) for a user terminal to a radio resource for the enhanced PDCCH; and
a transmitter configured to transmit the enhanced PDCCH mapped to the radio resource,
wherein the radio resource and an antenna port of a DeModulation-Reference Signal (DM-RS) are in association with each other, and
the radio resource is formed with divided enhanced Control Channel Elements (eCCEs), and divided eCCEs forming a same eCCE are assigned with a same index number and are distributed-mapped to different resource blocks which are allocated to the enhanced PDCCH.

2. The radio base station apparatus according to claim 1, wherein the divided eCCEs are mapped, in order of index numbers, to different virtual resource blocks arranged in a frequency direction and the different virtual resource blocks are interleaved.

3. The radio base station apparatus according to claim 2, wherein the processor controls mapping positions of the divided eCCEs in such a manner as to reduce difference in number of available resource elements between eCCEs of different index numbers.

4. The radio base station apparatus according to claim 3, wherein the different resource blocks are mapped to discontinuous frequency bands.

5. The radio base station apparatus according to claim 2, wherein the different resource blocks are mapped to discontinuous frequency bands.

6. The radio base station apparatus according to claim 1, wherein the different resource blocks are mapped to discontinuous frequency bands.

7. A user terminal comprising:
a receiver configured to receive an enhanced Physical Downlink Control Channel (enhanced PDCCH) mapped to a radio resource for the enhanced PDCCH; and
a demodulator configured to demodulate the enhanced PDCCH,
wherein the radio resource and an antenna port of a DeModulation-Reference Signal (DM-RS) are in association with each other, and
the radio resource is formed with divided enhanced Control Channel Elements (eCCEs), and divided eCCEs forming a same eCCE are assigned with a same index number and are distributed-mapped to different resource blocks which are allocated to the enhanced PDCCH.

8. A radio communication system comprising:
a radio base station apparatus comprising:
a processor configured to map an enhanced Physical Downlink Control Channel (enhanced PDCCH) for a user terminal to a radio resource for the enhanced PDCCH; and
a transmitter configured to transmit the enhanced PDCCH mapped to the radio resource; and
a user terminal comprising:
a receiver configured to receive the enhanced PDCCH; and
a demodulator configured to demodulate the enhanced PDCCH,
wherein the radio resource and an antenna port of a DeModulation-Reference Signal (DM-RS) are in association with each other, and the radio resource is formed with divided enhanced Control Channel Elements (eCCEs), and divided eCCEs forming a same eCCE are assigned with a same index number and are distributed-mapped to different resource blocks which are allocated to the enhanced PDCCH.

9. A radio communication method in a radio base station apparatus transmitting an enhanced Physical Downlink Control Channel (enhanced PDCCH), the method comprising:

mapping the enhanced PDCCH for a user terminal to a radio resource for the enhanced PDCCH; and transmitting the enhanced PDCCH mapped to the radio resource, wherein the radio resource and an antenna port of a DeModulation-Reference Signal (DM-RS) are in association with each other, and the radio resource is formed with divided enhanced Control Channel Elements (eCCEs), and divided eCCEs forming a same eCCE are assigned with a same index number and are distributed-mapped to different resource blocks which are allocated to the enhanced PDCCH.

* * * * *